(12) United States Patent
Smayling et al.

(10) Patent No.: US 9,589,091 B2
(45) Date of Patent: *Mar. 7, 2017

(54) SCALABLE META-DATA OBJECTS

(71) Applicant: Tela Innovations, Inc., Los Gatos, CA (US)

(72) Inventors: Michael C. Smayling, Fremont, CA (US); Daryl Fox, Campbell, CA (US); Jonathan R. Quandt, San Jose, CA (US); Scott T. Becker, Scotts Valley, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,845

(22) Filed: Sep. 9, 2014

(65) Prior Publication Data

US 2014/0380260 A1    Dec. 25, 2014

Related U.S. Application Data

(63) Continuation of application No. 13/312,673, filed on Dec. 6, 2011, now Pat. No. 8,839,175.

(Continued)

(51) Int. Cl.
*G06F 17/50* (2006.01)

(52) U.S. Cl.
CPC ...... *G06F 17/5072* (2013.01); *G06F 17/5036* (2013.01); *G06F 17/505* (2013.01); *G06F 17/5077* (2013.01)

(58) Field of Classification Search
CPC ............... G06F 17/505; G06F 17/5072; G06F 17/5077; G06F 17/5036

(Continued)

(56) References Cited

U.S. PATENT DOCUMENTS

| 4,069,493 A | 1/1978 | Bobenrieth |
|---|---|---|
| 4,197,555 A | 4/1980 | Uehara et al. |

(Continued)

FOREIGN PATENT DOCUMENTS

| EP | 0102644 | 7/1989 |
|---|---|---|
| EP | 0788166 | 8/1997 |

(Continued)

OTHER PUBLICATIONS

Acar, et al., "A Linear-Centric Simulation Framework for Parametric Fluctuations", 2002, IEEE, Carnegie Mellon University USA, pp. 1-8, Jan. 28, 2002.

(Continued)

*Primary Examiner* — Phallaka Kik
(74) *Attorney, Agent, or Firm* — Martine Penilla Group, LLP

(57) ABSTRACT

A method is disclosed for defining an integrated circuit. The method includes generating a digital data file that includes both electrical connection information and physical topology information for a number of circuit components. The method also includes operating a computer to execute a layout generation program. The layout generation program reads the electrical connection and physical topology information for each of the number of circuit components from the digital data file and automatically creates one or more layout structures necessary to form each of the number of circuit components in a semiconductor device fabrication process, such that the one or more layout structures comply with the physical topology information read from the digital data file. The computer is also operated to store the one or more layout structures necessary to form each of the number of circuit components in a digital format on a computer readable medium.

22 Claims, 12 Drawing Sheets

Related U.S. Application Data

(60) Provisional application No. 61/420,313, filed on Dec. 6, 2010.

(58) Field of Classification Search
USPC ........ 716/104, 103, 122, 123, 124, 129, 130
See application file for complete search history.

(56) References Cited

U.S. PATENT DOCUMENTS

| | | | |
|---|---|---|---|
| 4,417,161 A | 11/1983 | Uya | |
| 4,424,460 A | 1/1984 | Best | |
| 4,575,648 A | 3/1986 | Lee | |
| 4,602,270 A | 7/1986 | Finegold | |
| 4,613,940 A | 9/1986 | Shenton et al. | |
| 4,657,628 A | 4/1987 | Holloway et al. | |
| 4,682,202 A | 7/1987 | Tanizawa | |
| 4,745,084 A | 5/1988 | Rowson et al. | |
| 4,780,753 A | 10/1988 | Shinichi et al. | |
| 4,801,986 A | 1/1989 | Chang | |
| 4,804,636 A | 2/1989 | Groover, III | |
| 4,812,688 A | 3/1989 | Chu et al. | |
| 4,884,115 A | 11/1989 | Michel et al. | |
| 4,928,160 A | 5/1990 | Crafts | |
| 4,975,756 A | 12/1990 | Haken et al. | |
| 5,047,979 A | 9/1991 | Leung | |
| 5,068,603 A | 11/1991 | Mahoney | |
| 5,079,614 A | 1/1992 | Khatakhotan | |
| 5,097,422 A | 3/1992 | Corbin et al. | |
| 5,117,277 A | 5/1992 | Yuyama et al. | |
| 5,121,186 A | 6/1992 | Wong et al. | |
| 5,208,765 A | 5/1993 | Turnbull | |
| 5,224,057 A | 6/1993 | Igarashi | |
| 5,242,770 A | 9/1993 | Chen et al. | |
| 5,268,319 A | 12/1993 | Harari | |
| 5,298,774 A | 3/1994 | Ueda et al. | |
| 5,313,426 A | 5/1994 | Sakuma et al. | |
| 5,338,963 A | 8/1994 | Klaasen | |
| 5,351,197 A | 9/1994 | Upton et al. | |
| 5,359,226 A | 10/1994 | DeJong | |
| 5,365,454 A | 11/1994 | Nakagawa et al. | |
| 5,367,187 A | 11/1994 | Yuen | |
| 5,378,649 A | 1/1995 | Huang | |
| 5,396,128 A | 3/1995 | Dunning et al. | |
| 5,420,447 A | 5/1995 | Waggoner | |
| 5,461,577 A * | 10/1995 | Shaw et al. | ........ 716/116 |
| 5,471,403 A | 11/1995 | Fujimaga | |
| 5,497,334 A | 3/1996 | Russell et al. | |
| 5,497,337 A | 3/1996 | Ponnapalli et al. | |
| 5,526,307 A | 6/1996 | Lin et al. | |
| 5,536,955 A | 7/1996 | Ali | |
| 5,545,904 A | 8/1996 | Orbach | |
| 5,581,098 A | 12/1996 | Chang | |
| 5,581,202 A | 12/1996 | Yano et al. | |
| 5,612,893 A | 3/1997 | Hao et al. | |
| 5,636,002 A | 6/1997 | Garofalo | |
| 5,656,861 A | 8/1997 | Godinho et al. | |
| 5,682,323 A | 10/1997 | Pasch et al. | |
| 5,684,311 A | 11/1997 | Shaw | |
| 5,684,733 A | 11/1997 | Wu et al. | |
| 5,698,873 A | 12/1997 | Colwell et al. | |
| 5,705,301 A | 1/1998 | Garza et al. | |
| 5,723,883 A | 3/1998 | Gheewalla | |
| 5,723,908 A | 3/1998 | Fuchida et al. | |
| 5,740,068 A | 4/1998 | Liebmann et al. | |
| 5,745,374 A | 4/1998 | Matsumoto | |
| 5,764,533 A | 6/1998 | deDood | |
| 5,774,367 A | 6/1998 | Reyes et al. | |
| 5,780,909 A | 7/1998 | Hayashi | |
| 5,789,776 A | 8/1998 | Lancaster et al. | |
| 5,790,417 A | 8/1998 | Chao et al. | |
| 5,796,128 A | 8/1998 | Tran et al. | |
| 5,796,624 A | 8/1998 | Sridhar et al. | |
| 5,798,298 A | 8/1998 | Yang et al. | |
| 5,814,844 A | 9/1998 | Nagata et al. | |
| 5,825,203 A | 10/1998 | Kusunoki et al. | |
| 5,834,851 A | 11/1998 | Ikeda et al. | |
| 5,838,594 A | 11/1998 | Kojima | |
| 5,841,663 A | 11/1998 | Sharma et al. | |
| 5,847,421 A | 12/1998 | Yamaguchi | |
| 5,850,362 A | 12/1998 | Sakuma et al. | |
| 5,852,562 A | 12/1998 | Shinomiya et al. | |
| 5,858,580 A | 1/1999 | Wang et al. | |
| 5,898,194 A | 4/1999 | Gheewala | |
| 5,900,340 A | 5/1999 | Reich et al. | |
| 5,905,287 A | 5/1999 | Hirata | |
| 5,908,827 A | 6/1999 | Sirna | |
| 5,915,199 A | 6/1999 | Hsu | |
| 5,917,207 A | 6/1999 | Colwell et al. | |
| 5,920,486 A | 7/1999 | Beahm et al. | |
| 5,923,059 A | 7/1999 | Gheewala | |
| 5,923,060 A | 7/1999 | Gheewala | |
| 5,929,469 A | 7/1999 | Mimoto et al. | |
| 5,930,163 A | 7/1999 | Hara et al. | |
| 5,935,763 A | 8/1999 | Caterer et al. | |
| 5,949,101 A | 9/1999 | Aritome | |
| 5,973,507 A | 10/1999 | Yamazaki | |
| 5,977,305 A | 11/1999 | Wigler et al. | |
| 5,977,574 A | 11/1999 | Schmitt et al. | |
| 5,998,879 A | 12/1999 | Iwaki et al. | |
| 6,009,251 A | 12/1999 | Ho et al. | |
| 6,026,223 A | 2/2000 | Scepanovic et al. | |
| 6,026,225 A | 2/2000 | Iwasaki | |
| 6,037,613 A | 3/2000 | Mariyama | |
| 6,037,617 A | 3/2000 | Kumagai | |
| 6,044,007 A | 3/2000 | Capodieci | |
| 6,054,872 A | 4/2000 | Fudanuki et al. | |
| 6,063,132 A | 5/2000 | DeCamp et al. | |
| 6,077,310 A | 6/2000 | Yamamoto et al. | |
| 6,080,206 A | 6/2000 | Tadokoro et al. | |
| 6,084,255 A | 7/2000 | Ueda | |
| 6,084,437 A | 7/2000 | Sako | |
| 6,091,845 A | 7/2000 | Pierrat et al. | |
| 6,099,584 A | 8/2000 | Arnold et al. | |
| 6,100,025 A | 8/2000 | Wigler et al. | |
| 6,114,071 A | 9/2000 | Chen et al. | |
| 6,144,227 A | 11/2000 | Sato | |
| 6,159,839 A | 12/2000 | Jeng et al. | |
| 6,166,415 A | 12/2000 | Sakemi et al. | |
| 6,166,560 A | 12/2000 | Ogura et al. | |
| 6,174,742 B1 | 1/2001 | Sudhindranath et al. | |
| 6,182,272 B1 | 1/2001 | Andreev et al. | |
| 6,194,104 B1 | 2/2001 | Hsu | |
| 6,194,252 B1 | 2/2001 | Yamaguchi | |
| 6,194,912 B1 | 2/2001 | Or-Bach | |
| 6,209,123 B1 * | 3/2001 | Maziasz et al. | ........ 716/123 |
| 6,230,299 B1 | 5/2001 | McSherry et al. | |
| 6,232,173 B1 | 5/2001 | Hsu et al. | |
| 6,240,542 B1 | 5/2001 | Kapur | |
| 6,249,902 B1 | 6/2001 | Igusa et al. | |
| 6,255,600 B1 | 7/2001 | Schaper | |
| 6,255,845 B1 | 7/2001 | Wong et al. | |
| 6,262,487 B1 | 7/2001 | Igarashi et al. | |
| 6,269,472 B1 | 7/2001 | Garza et al. | |
| 6,275,973 B1 | 8/2001 | Wein | |
| 6,282,696 B1 | 8/2001 | Garza et al. | |
| 6,291,276 B1 | 9/2001 | Gonzalez | |
| 6,297,668 B1 | 10/2001 | Schober | |
| 6,297,674 B1 | 10/2001 | Kono et al. | |
| 6,303,252 B1 | 10/2001 | Lin | |
| 6,331,733 B1 | 12/2001 | Or-Bach et al. | |
| 6,331,791 B1 | 12/2001 | Huang | |
| 6,335,250 B1 | 1/2002 | Egi | |
| 6,338,972 B1 | 1/2002 | Sudhindranath et al. | |
| 6,347,062 B2 | 2/2002 | Nii et al. | |
| 6,356,112 B1 | 3/2002 | Tran et al. | |
| 6,359,804 B2 | 3/2002 | Kuriyama et al. | |
| 6,370,679 B1 | 4/2002 | Chang et al. | |
| 6,378,110 B1 | 4/2002 | Ho | |
| 6,380,592 B2 | 4/2002 | Tooher et al. | |
| 6,388,296 B1 | 5/2002 | Hsu | |
| 6,393,601 B1 | 5/2002 | Tanaka et al. | |
| 6,399,972 B1 | 6/2002 | Masuda et al. | |
| 6,400,183 B2 | 6/2002 | Yamashita et al. | |
| 6,408,427 B1 | 6/2002 | Cong et al. | |

(56) References Cited

U.S. PATENT DOCUMENTS

| | | | |
|---|---|---|---|
| 6,415,421 B2 | 7/2002 | Anderson et al. | |
| 6,416,907 B1 | 7/2002 | Winder et al. | |
| 6,417,549 B1 | 7/2002 | Oh | |
| 6,421,820 B1 | 7/2002 | Mansfield et al. | |
| 6,425,112 B1 | 7/2002 | Bula et al. | |
| 6,425,117 B1 | 7/2002 | Pasch et al. | |
| 6,426,269 B1 | 7/2002 | Haffner et al. | |
| 6,436,805 B1 | 8/2002 | Trivedi | |
| 6,445,049 B1 | 9/2002 | Iranmanesh | |
| 6,445,065 B1 | 9/2002 | Gheewala et al. | |
| 6,467,072 B1 * | 10/2002 | Yang et al. | 716/119 |
| 6,469,328 B2 | 10/2002 | Yanai et al. | |
| 6,470,489 B1 | 10/2002 | Chang et al. | |
| 6,476,493 B2 | 11/2002 | Or-Bach et al. | |
| 6,477,695 B1 | 11/2002 | Gandhi | |
| 6,480,032 B1 | 11/2002 | Aksamit | |
| 6,480,989 B2 | 11/2002 | Chan et al. | |
| 6,492,066 B1 | 12/2002 | Capodieci et al. | |
| 6,496,965 B1 | 12/2002 | van Ginneken et al. | |
| 6,504,186 B2 | 1/2003 | Kanamoto et al. | |
| 6,505,327 B2 | 1/2003 | Lin | |
| 6,505,328 B1 | 1/2003 | van Ginneken et al. | |
| 6,507,941 B1 | 1/2003 | Leung et al. | |
| 6,509,952 B1 | 1/2003 | Govil et al. | |
| 6,514,849 B1 | 2/2003 | Hui et al. | |
| 6,516,459 B1 | 2/2003 | Sahouria | |
| 6,523,156 B2 | 2/2003 | Cirit | |
| 6,525,350 B1 | 2/2003 | Kinoshita et al. | |
| 6,536,028 B1 | 3/2003 | Katsioulas et al. | |
| 6,543,039 B1 | 4/2003 | Watanabe | |
| 6,553,544 B2 | 4/2003 | Tanaka et al. | |
| 6,553,559 B2 | 4/2003 | Liebmann et al. | |
| 6,553,562 B2 | 4/2003 | Capodieci et al. | |
| 6,566,720 B2 | 5/2003 | Aldrich | |
| 6,570,234 B1 | 5/2003 | Gardner | |
| 6,571,140 B1 | 5/2003 | Wewalaarachchi | |
| 6,571,379 B2 | 5/2003 | Takayama | |
| 6,574,786 B1 | 6/2003 | Pohlenz et al. | |
| 6,578,190 B2 | 6/2003 | Ferguson et al. | |
| 6,583,041 B1 | 6/2003 | Capodieci | |
| 6,588,005 B1 | 7/2003 | Kobayashi et al. | |
| 6,590,289 B2 | 7/2003 | Shively | |
| 6,591,207 B2 | 7/2003 | Naya et al. | |
| 6,609,235 B2 | 8/2003 | Ramaswamy et al. | |
| 6,610,607 B1 | 8/2003 | Armbrust et al. | |
| 6,617,621 B1 | 9/2003 | Gheewala et al. | |
| 6,620,561 B2 | 9/2003 | Winder et al. | |
| 6,621,132 B2 | 9/2003 | Onishi et al. | |
| 6,632,741 B1 | 10/2003 | Clevenger et al. | |
| 6,633,182 B2 | 10/2003 | Pileggi et al. | |
| 6,635,935 B2 | 10/2003 | Makino | |
| 6,642,744 B2 | 11/2003 | Or-Bach et al. | |
| 6,643,831 B2 | 11/2003 | Chang et al. | |
| 6,650,014 B2 | 11/2003 | Kariyazaki | |
| 6,661,041 B2 | 12/2003 | Keeth | |
| 6,662,350 B2 | 12/2003 | Fried et al. | |
| 6,664,587 B2 | 12/2003 | Guterman et al. | |
| 6,673,638 B1 | 1/2004 | Bendik et al. | |
| 6,677,649 B2 | 1/2004 | Minami et al. | |
| 6,687,895 B2 | 2/2004 | Zhang | |
| 6,690,206 B2 | 2/2004 | Rikino et al. | |
| 6,691,297 B1 | 2/2004 | Misaka et al. | |
| 6,700,405 B1 | 3/2004 | Hirairi | |
| 6,703,170 B1 | 3/2004 | Pindo | |
| 6,709,880 B2 | 3/2004 | Yamamoto et al. | |
| 6,714,903 B1 | 3/2004 | Chu et al. | |
| 6,732,334 B2 * | 5/2004 | Nakatsuka | 716/50 |
| 6,732,338 B2 | 5/2004 | Crouse et al. | |
| 6,732,344 B2 | 5/2004 | Sakamoto et al. | |
| 6,734,506 B2 | 5/2004 | Oyamatsu | |
| 6,737,199 B1 | 5/2004 | Hsieh | |
| 6,737,318 B2 | 5/2004 | Murata et al. | |
| 6,737,347 B1 | 5/2004 | Houston et al. | |
| 6,745,372 B2 | 6/2004 | Cote et al. | |
| 6,745,380 B2 | 6/2004 | Bodendorf et al. | |
| 6,749,972 B2 | 6/2004 | Yu | |
| 6,750,555 B2 | 6/2004 | Satomi et al. | |
| 6,760,269 B2 | 7/2004 | Nakase et al. | |
| 6,765,245 B2 | 7/2004 | Bansal | |
| 6,777,138 B2 | 8/2004 | Pierrat et al. | |
| 6,777,146 B1 | 8/2004 | Samuels | |
| 6,787,823 B2 | 9/2004 | Shibutani | |
| 6,789,244 B1 | 9/2004 | Dasasathyan et al. | |
| 6,789,246 B1 | 9/2004 | Mohan et al. | |
| 6,792,591 B2 | 9/2004 | Shi et al. | |
| 6,792,593 B2 | 9/2004 | Takashima et al. | |
| 6,794,677 B2 | 9/2004 | Tamaki et al. | |
| 6,794,914 B2 | 9/2004 | Sani et al. | |
| 6,795,332 B2 | 9/2004 | Yamaoka et al. | |
| 6,795,358 B2 | 9/2004 | Tanaka et al. | |
| 6,795,952 B1 | 9/2004 | Stine et al. | |
| 6,795,953 B2 | 9/2004 | Bakarian et al. | |
| 6,800,883 B2 | 10/2004 | Furuya et al. | |
| 6,806,180 B2 | 10/2004 | Cho | |
| 6,807,663 B2 | 10/2004 | Cote et al. | |
| 6,809,399 B2 | 10/2004 | Ikeda et al. | |
| 6,812,574 B2 | 11/2004 | Tomita et al. | |
| 6,818,389 B2 | 11/2004 | Fritze et al. | |
| 6,818,929 B2 | 11/2004 | Tsutsumi et al. | |
| 6,819,136 B2 | 11/2004 | Or-Bach | |
| 6,820,248 B1 | 11/2004 | Gan | |
| 6,826,738 B2 | 11/2004 | Cadouri | |
| 6,834,375 B1 | 12/2004 | Stine et al. | |
| 6,835,991 B2 | 12/2004 | Pell, III | |
| 6,841,880 B2 | 1/2005 | Matsumoto et al. | |
| 6,850,854 B2 | 2/2005 | Naya et al. | |
| 6,854,096 B2 | 2/2005 | Eaton et al. | |
| 6,854,100 B1 | 2/2005 | Chuang et al. | |
| 6,867,073 B1 | 3/2005 | Enquist | |
| 6,871,338 B2 | 3/2005 | Yamauchi | |
| 6,872,990 B1 | 3/2005 | Kang | |
| 6,877,144 B1 | 4/2005 | Rittman et al. | |
| 6,881,523 B2 | 4/2005 | Smith | |
| 6,884,712 B2 | 4/2005 | Yelehanka et al. | |
| 6,885,045 B2 | 4/2005 | Hidaka | |
| 9,006,841 B2 | 4/2005 | Kumar | |
| 6,889,370 B1 | 5/2005 | Kerzman et al. | |
| 6,897,517 B2 | 5/2005 | Houdt et al. | |
| 6,897,536 B2 | 5/2005 | Nomura et al. | |
| 6,898,770 B2 | 5/2005 | Boluki et al. | |
| 6,904,582 B1 | 6/2005 | Rittman et al. | |
| 6,918,104 B2 | 7/2005 | Pierrat et al. | |
| 6,920,079 B2 | 7/2005 | Shibayama | |
| 6,921,982 B2 | 7/2005 | Joshi et al. | |
| 6,922,354 B2 | 7/2005 | Ishikura et al. | |
| 6,924,560 B2 | 8/2005 | Wang et al. | |
| 6,928,635 B2 | 8/2005 | Pramanik et al. | |
| 6,931,617 B2 | 8/2005 | Sanie et al. | |
| 6,953,956 B2 | 10/2005 | Or-Bach et al. | |
| 6,954,918 B2 | 10/2005 | Houston | |
| 6,957,402 B2 | 10/2005 | Templeton et al. | |
| 6,968,527 B2 | 11/2005 | Pierrat | |
| 6,974,978 B1 | 12/2005 | Possley | |
| 6,977,856 B2 | 12/2005 | Tanaka et al. | |
| 6,978,436 B2 | 12/2005 | Cote et al. | |
| 6,978,437 B1 | 12/2005 | Rittman et al. | |
| 6,980,211 B2 * | 12/2005 | Lin et al. | 345/440 |
| 6,992,394 B2 | 1/2006 | Park | |
| 6,992,925 B2 | 1/2006 | Peng | |
| 6,993,741 B2 | 1/2006 | Liebmann et al. | |
| 6,994,939 B1 | 2/2006 | Ghandehari et al. | |
| 6,998,722 B2 | 2/2006 | Madurawe | |
| 7,003,068 B2 | 2/2006 | Kushner et al. | |
| 7,009,862 B2 | 3/2006 | Higeta et al. | |
| 7,016,214 B2 | 3/2006 | Kawamata | |
| 7,022,559 B2 | 4/2006 | Barnak et al. | |
| 7,028,285 B2 | 4/2006 | Cote et al. | |
| 7,041,568 B2 | 5/2006 | Goldbach et al. | |
| 7,052,972 B2 | 5/2006 | Sandhu et al. | |
| 7,053,424 B2 | 5/2006 | Ono | |
| 7,063,920 B2 | 6/2006 | Baba-Ali | |
| 7,064,068 B2 | 6/2006 | Chou et al. | |
| 7,065,731 B2 | 6/2006 | Jacques et al. | |
| 7,079,413 B2 | 7/2006 | Tsukamoto et al. | |

(56) References Cited

U.S. PATENT DOCUMENTS

| | | |
|---|---|---|
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,126,837 B1 | 10/2006 | Banachowicz et al. |
| 7,132,203 B2 | 11/2006 | Pierrat |
| 7,137,092 B2 | 11/2006 | Maeda |
| 7,141,853 B2 | 11/2006 | Campbell et al. |
| 7,143,380 B1 | 11/2006 | Anderson et al. |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,183,611 B2 | 2/2007 | Bhattacharyya |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,205,191 B2 | 4/2007 | Kobayashi |
| 7,208,794 B2 | 4/2007 | Hofmann et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,257,017 B2 | 8/2007 | Liaw |
| 7,264,990 B2 | 9/2007 | Rueckes et al. |
| 7,266,787 B2 | 9/2007 | Hughes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,315,994 B2 | 1/2008 | Aller et al. |
| 7,327,591 B2 | 2/2008 | Sadra et al. |
| 7,329,938 B2 | 2/2008 | Kinoshita |
| 7,329,953 B2 | 2/2008 | Tu |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,358,131 B2 | 4/2008 | Bhattacharyya |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,424,696 B2 | 9/2008 | Vogel et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 * | 11/2008 | Becker et al. ............. 257/206 |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,492,013 B2 | 2/2009 | Correale, Jr. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,355 B2 | 4/2009 | Katase |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Yang et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,781,847 B2 | 8/2010 | Yang |
| 7,791,109 B2 | 9/2010 | Wann et al. |
| 7,802,219 B2 | 9/2010 | Tomar et al. |
| 7,816,740 B2 | 10/2010 | Houston |
| 7,825,437 B2 | 11/2010 | Pillarisetty et al. |
| 7,842,975 B2 * | 11/2010 | Becker et al. ............. 257/204 |
| 7,873,929 B2 | 1/2011 | Kahng et al. |
| 7,882,456 B2 | 2/2011 | Zach |
| 7,888,705 B2 | 2/2011 | Becker et al. |
| 7,898,040 B2 | 3/2011 | Nawaz |
| 7,906,801 B2 | 3/2011 | Becker et al. |
| 7,908,578 B2 | 3/2011 | Becker et al. |
| 7,910,958 B2 | 3/2011 | Becker et al. |
| 7,910,959 B2 | 3/2011 | Becker et al. |
| 7,917,877 B2 | 3/2011 | Singh et al. |

(56) References Cited

U.S. PATENT DOCUMENTS

| | | |
|---|---|---|
| 7,917,879 B2 | 3/2011 | Becker et al. |
| 7,923,266 B2 | 4/2011 | Thijs et al. |
| 7,923,337 B2 | 4/2011 | Chang et al. |
| 7,923,757 B2 | 4/2011 | Becker et al. |
| 7,926,001 B2 | 4/2011 | Pierrat |
| 7,932,544 B2 | 4/2011 | Becker et al. |
| 7,932,545 B2 | 4/2011 | Becker et al. |
| 7,934,184 B2 | 4/2011 | Zhang |
| 7,939,443 B2 | 5/2011 | Fox et al. |
| 7,943,966 B2 | 5/2011 | Becker et al. |
| 7,943,967 B2 | 5/2011 | Becker et al. |
| 7,948,012 B2 | 5/2011 | Becker et al. |
| 7,948,013 B2 | 5/2011 | Becker et al. |
| 7,952,119 B2 | 5/2011 | Becker et al. |
| 7,956,421 B2 | 6/2011 | Becker |
| 7,958,465 B2 | 6/2011 | Lu et al. |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,989,847 B2 | 8/2011 | Becker et al. |
| 7,989,848 B2 | 8/2011 | Becker et al. |
| 7,992,122 B1 | 8/2011 | Burstein et al. |
| 7,994,583 B2 | 8/2011 | Inaba |
| 8,004,042 B2 | 8/2011 | Yang et al. |
| 8,022,441 B2 | 9/2011 | Becker et al. |
| 8,030,689 B2 | 10/2011 | Becker et al. |
| 8,035,133 B2 | 10/2011 | Becker et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,003 B2 | 12/2011 | Becker et al. |
| 8,072,053 B2 | 12/2011 | Li |
| 8,088,679 B2 | 1/2012 | Becker et al. |
| 8,088,680 B2 | 1/2012 | Becker et al. |
| 8,088,681 B2 | 1/2012 | Becker et al. |
| 8,088,682 B2 | 1/2012 | Becker et al. |
| 8,089,098 B2 | 1/2012 | Becker et al. |
| 8,089,099 B2 | 1/2012 | Becker et al. |
| 8,089,100 B2 | 1/2012 | Becker et al. |
| 8,089,101 B2 | 1/2012 | Becker et al. |
| 8,089,102 B2 | 1/2012 | Becker et al. |
| 8,089,103 B2 | 1/2012 | Becker et al. |
| 8,089,104 B2 | 1/2012 | Becker et al. |
| 8,101,975 B2 | 1/2012 | Becker et al. |
| 8,110,854 B2 | 2/2012 | Becker et al. |
| 8,129,750 B2 | 3/2012 | Becker et al. |
| 8,129,751 B2 | 3/2012 | Becker et al. |
| 8,129,752 B2 | 3/2012 | Becker et al. |
| 8,129,754 B2 | 3/2012 | Becker et al. |
| 8,129,755 B2 | 3/2012 | Becker et al. |
| 8,129,756 B2 | 3/2012 | Becker et al. |
| 8,129,757 B2 | 3/2012 | Becker et al. |
| 8,129,819 B2 | 3/2012 | Becker et al. |
| 8,130,529 B2 | 3/2012 | Tanaka |
| 8,134,183 B2 | 3/2012 | Becker et al. |
| 8,134,184 B2 | 3/2012 | Becker et al. |
| 8,134,185 B2 | 3/2012 | Becker et al. |
| 8,134,186 B2 | 3/2012 | Becker et al. |
| 8,138,525 B2 | 3/2012 | Becker et al. |
| 8,161,427 B2 | 4/2012 | Morgenshtein et al. |
| 8,178,905 B2 | 5/2012 | Toubou |
| 8,178,909 B2 | 5/2012 | Venkatraman et al. |
| 8,198,656 B2 | 6/2012 | Becker et al. |
| 8,207,053 B2 | 6/2012 | Becker et al. |
| 8,214,778 B2 | 7/2012 | Quandt et al. |
| 8,217,428 B2 | 7/2012 | Becker et al. |
| 8,225,239 B2 | 7/2012 | Reed et al. |
| 8,225,261 B2 | 7/2012 | Hong et al. |
| 8,245,180 B2 | 8/2012 | Smayling et al. |
| 8,247,846 B2 | 8/2012 | Becker |
| 8,253,172 B2 | 8/2012 | Becker et al. |
| 8,253,173 B2 | 8/2012 | Becker et al. |
| 8,258,547 B2 | 9/2012 | Becker et al. |
| 8,258,548 B2 | 9/2012 | Becker et al. |
| 8,258,549 B2 | 9/2012 | Becker et al. |
| 8,258,550 B2 | 9/2012 | Becker et al. |
| 8,258,551 B2 | 9/2012 | Becker et al. |
| 8,258,552 B2 | 9/2012 | Becker et al. |
| 8,258,581 B2 | 9/2012 | Becker et al. |
| 8,264,007 B2 | 9/2012 | Becker et al. |
| 8,264,008 B2 | 9/2012 | Becker et al. |
| 8,264,009 B2 | 9/2012 | Becker et al. |
| 8,283,701 B2 | 10/2012 | Becker et al. |
| 8,294,212 B2 | 10/2012 | Wang et al. |
| 8,316,327 B2 | 11/2012 | Herold |
| 8,356,268 B2 | 1/2013 | Becker et al. |
| 8,363,455 B2 | 1/2013 | Rennie |
| 8,378,407 B2 | 2/2013 | Audzeyeu et al. |
| 8,395,224 B2 | 3/2013 | Becker et al. |
| 8,402,397 B2 | 3/2013 | Robles et al. |
| 8,405,163 B2 | 3/2013 | Becker et al. |
| 8,422,274 B2 | 4/2013 | Tomita et al. |
| 8,436,400 B2 * | 5/2013 | Becker et al. ............... 257/206 |
| 8,453,094 B2 * | 5/2013 | Kornachuk et al. .......... 716/126 |
| 8,575,706 B2 | 11/2013 | Becker et al. |
| 8,667,443 B2 * | 3/2014 | Smayling et al. ............ 716/119 |
| 8,701,071 B2 * | 4/2014 | Kornachuk et al. .......... 716/126 |
| 8,735,995 B2 * | 5/2014 | Becker et al. ............... 257/401 |
| 8,756,551 B2 * | 6/2014 | Becker et al. ............... 716/122 |
| 8,836,045 B2 * | 9/2014 | Becker et al. ............... 257/401 |
| 8,839,162 B2 * | 9/2014 | Amundson et al. .......... 716/104 |
| 8,839,175 B2 * | 9/2014 | Smayling et al. ............ 716/122 |
| 8,847,329 B2 * | 9/2014 | Becker et al. ............... 257/401 |
| 8,863,063 B2 * | 10/2014 | Becker et al. ............... 716/118 |
| 9,202,779 B2 * | 12/2015 | Kornachuk ......... G06F 17/5072 |
| 9,269,423 B2 | 2/2016 | Sever |
| 9,336,344 B2 | 5/2016 | Smayling |
| 2001/0049813 A1 | 12/2001 | Chan et al. |
| 2002/0003270 A1 | 1/2002 | Makino |
| 2002/0015899 A1 | 2/2002 | Chen et al. |
| 2002/0030510 A1 | 3/2002 | Kono et al. |
| 2002/0063582 A1 | 5/2002 | Rikino |
| 2002/0068423 A1 | 6/2002 | Park et al. |
| 2002/0079927 A1 | 6/2002 | Katoh et al. |
| 2002/0149392 A1 | 10/2002 | Cho |
| 2002/0166107 A1 | 11/2002 | Capodieci et al. |
| 2002/0194575 A1 * | 12/2002 | Allen et al. ..................... 716/17 |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0103176 A1 | 6/2003 | Abe et al. |
| 2003/0106037 A1 | 6/2003 | Moniwa et al. |
| 2003/0117168 A1 | 6/2003 | Uneme et al. |
| 2003/0124847 A1 | 7/2003 | Houston et al. |
| 2003/0125917 A1 * | 7/2003 | Rich et al. ..................... 703/14 |
| 2003/0126569 A1 * | 7/2003 | Rich et al. ..................... 716/6 |
| 2003/0145288 A1 * | 7/2003 | Wang et al. .................... 716/2 |
| 2003/0145299 A1 | 7/2003 | Fried et al. |
| 2003/0177465 A1 | 9/2003 | MacLean et al. |
| 2003/0185076 A1 | 10/2003 | Worley |
| 2003/0203287 A1 * | 10/2003 | Miyagawa ..................... 430/5 |
| 2003/0229868 A1 | 12/2003 | White et al. |
| 2003/0229875 A1 | 12/2003 | Smith et al. |
| 2004/0029372 A1 | 2/2004 | Jang et al. |
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0164360 A1 | 8/2004 | Nishida et al. |
| 2004/0169201 A1 | 9/2004 | Hidaka |
| 2004/0194050 A1 | 9/2004 | Hwang et al. |
| 2004/0196705 A1 | 10/2004 | Ishikura et al. |
| 2004/0229135 A1 | 11/2004 | Wang et al. |
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1 | 1/2005 | Hwang et al. |

(56) References Cited

U.S. PATENT DOCUMENTS

| | | |
|---|---|---|
| 2005/0012157 A1 | 1/2005 | Cho et al. |
| 2005/0044522 A1 | 2/2005 | Maeda |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato |
| 2005/0266621 A1 | 12/2005 | Kim |
| 2005/0268256 A1 | 12/2005 | Tsai et al. |
| 2005/0278673 A1* | 12/2005 | Kawachi ............................ 716/8 |
| 2005/0280031 A1 | 12/2005 | Yano |
| 2006/0036976 A1 | 2/2006 | Cohn |
| 2006/0038234 A1 | 2/2006 | Liaw |
| 2006/0063334 A1 | 3/2006 | Donze et al. |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain |
| 2006/0101370 A1 | 5/2006 | Cui et al. |
| 2006/0112355 A1 | 5/2006 | Pileggi et al. |
| 2006/0113533 A1 | 6/2006 | Tamaki et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0170108 A1 | 8/2006 | Hiroi |
| 2006/0177744 A1 | 8/2006 | Bodendorf et al. |
| 2006/0181310 A1 | 8/2006 | Rhee |
| 2006/0195809 A1 | 8/2006 | Cohn et al. |
| 2006/0195810 A1 | 8/2006 | Morton |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2006/0261417 A1 | 11/2006 | Suzuki |
| 2006/0277521 A1 | 12/2006 | Chen |
| 2007/0001304 A1 | 1/2007 | Liaw |
| 2007/0002617 A1 | 1/2007 | Houston |
| 2007/0004147 A1 | 1/2007 | Toubou |
| 2007/0007574 A1 | 1/2007 | Ohsawa |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0186196 A1* | 8/2007 | Tanaka ............................ 716/5 |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0234262 A1* | 10/2007 | Uedi et al. ...................... 716/11 |
| 2007/0241810 A1 | 10/2007 | Onda |
| 2007/0256039 A1 | 11/2007 | White |
| 2007/0257277 A1 | 11/2007 | Takeda et al. |
| 2007/0264758 A1 | 11/2007 | Correale |
| 2007/0274140 A1 | 11/2007 | Joshi et al. |
| 2007/0277129 A1 | 11/2007 | Allen et al. |
| 2007/0288882 A1* | 12/2007 | Kniffin et al. .................. 716/20 |
| 2007/0290361 A1 | 12/2007 | Chen |
| 2007/0294652 A1 | 12/2007 | Bowen |
| 2007/0297249 A1 | 12/2007 | Chang et al. |
| 2008/0001176 A1 | 1/2008 | Gopalakrishnan |
| 2008/0005712 A1 | 1/2008 | Charlebois et al. |
| 2008/0021689 A1* | 1/2008 | Yamashita et al. ............. 703/14 |
| 2008/0022247 A1* | 1/2008 | Kojima et al. .................... 716/8 |
| 2008/0046846 A1 | 2/2008 | Chew et al. |
| 2008/0081472 A1 | 4/2008 | Tanaka |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0098341 A1 | 4/2008 | Kobayashi et al. |
| 2008/0099795 A1 | 5/2008 | Bernstein et al. |
| 2008/0127000 A1* | 5/2008 | Majumder et al. ............... 716/2 |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1 | 10/2008 | Kakoschke et al. |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0308880 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1* | 2/2009 | Becker et al. .................. 716/11 |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0228857 A1* | 9/2009 | Kornachuk et al. ............ 716/13 |
| 2009/0235215 A1 | 9/2009 | Lavin |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1* | 12/2009 | Saxena et al. .................. 716/13 |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |

(56) References Cited

U.S. PATENT DOCUMENTS

| | | |
|---|---|---|
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1* | 2/2010 | Becker et al. ............ 716/8 |
| 2010/0096671 A1 | 4/2010 | Becker et al. |
| 2010/0115484 A1 | 5/2010 | Frederick |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0252865 A1* | 10/2010 | Van Der Zanden ......... 257/252 |
| 2010/0252896 A1 | 10/2010 | Smayling |
| 2010/0264468 A1 | 10/2010 | Xu |
| 2010/0270681 A1* | 10/2010 | Bird et al. ............... 257/773 |
| 2010/0287518 A1 | 11/2010 | Becker |
| 2010/0301482 A1 | 12/2010 | Schultz et al. |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2011/0298025 A1 | 12/2011 | Haensch et al. |
| 2011/0317477 A1 | 12/2011 | Liaw |
| 2012/0012932 A1 | 1/2012 | Perng et al. |
| 2012/0118854 A1 | 5/2012 | Smayling |
| 2012/0131528 A1 | 5/2012 | Chen |
| 2012/0273841 A1 | 11/2012 | Quandt et al. |
| 2013/0097574 A1 | 4/2013 | Balabanov et al. |
| 2013/0200465 A1* | 8/2013 | Becker et al. ............ 257/369 |
| 2013/0200469 A1* | 8/2013 | Becker et al. ............ 257/401 |
| 2013/0207198 A1* | 8/2013 | Becker et al. ............ 257/369 |
| 2013/0207199 A1* | 8/2013 | Becker et al. ............ 257/369 |
| 2013/0254732 A1* | 9/2013 | Kornachuk et al. ......... 716/123 |
| 2014/0197543 A1* | 7/2014 | Kornachuk et al. ......... 257/773 |
| 2015/0249041 A1 | 9/2015 | Becker et al. |
| 2015/0270218 A1 | 9/2015 | Becker et al. |
| 2016/0079159 A1* | 3/2016 | Kornachuk ........ G06F 17/5072 257/773 |

FOREIGN PATENT DOCUMENTS

| | | | |
|---|---|---|---|
| EP | 1394858 | 3/2004 | |
| EP | 1670062 | 6/2006 | |
| EP | 1833091 | 8/2007 | |
| EP | 1730777 | 9/2007 | |
| EP | 2251901 | 11/2010 | |
| FR | 2860920 | 4/2005 | |
| JP | 58-182242 | 10/1983 | |
| JP | 58-215827 | 12/1983 | |
| JP | 61-182244 | 8/1986 | |
| JP | S63-310136 A | 12/1988 | |
| JP | H01284115 | 11/1989 | |
| JP | 03-165061 | 7/1991 | |
| JP | H05152937 A | 6/1993 | |
| JP | H05211437 | 8/1993 | |
| JP | H05218362 | 8/1993 | |
| JP | H07-153927 A | 6/1995 | |
| JP | 2684980 | 7/1995 | |
| JP | 1995-302706 | 11/1995 | |
| JP | 1997-09289251 A | 11/1997 | |
| JP | 10-116911 | 5/1998 | |
| JP | 10116911 A * | 5/1998 | ............ H01L 21/82 |
| JP | 1999-045948 | 2/1999 | |
| JP | 2001-068558 | 3/2001 | |
| JP | 2001-168707 | 6/2001 | |
| JP | 2002-026125 | 1/2002 | |
| JP | 2002-026296 A | 1/2002 | |
| JP | 2002026125 A * | 1/2002 | ............ H01L 21/82 |
| JP | 2002-184870 A | 6/2002 | |
| JP | 2001-056463 | 9/2002 | |
| JP | 2002-258463 | 9/2002 | |
| JP | 2002-289703 | 10/2002 | |
| JP | 2001-272228 | 3/2003 | |
| JP | 2003-100872 | 4/2003 | |
| JP | 2003-264231 | 9/2003 | |
| JP | 2004-013920 | 1/2004 | |
| JP | 2004-200300 | 7/2004 | |
| JP | 2004-241529 | 8/2004 | |
| JP | 2004-342757 A | 12/2004 | |
| JP | 2005-020008 | 1/2005 | |
| JP | 2005020008 A * | 1/2005 | ........... H01L 21/822 |
| JP | 2003-359375 | 5/2005 | |
| JP | 2005-135971 A | 5/2005 | |
| JP | 2005-149265 | 6/2005 | |
| JP | 2005-183793 | 7/2005 | |
| JP | 2005-203447 | 7/2005 | |
| JP | 2005203447 A * | 7/2005 | ............ H01L 21/82 |
| JP | 2005-268610 | 9/2005 | |
| JP | 2006-073696 | 3/2006 | |
| JP | 2005-114752 | 10/2006 | |
| JP | 2006-303022 A | 11/2006 | |
| JP | 2007-012855 | 1/2007 | |
| JP | 2007-013060 | 1/2007 | |
| JP | 2007-043049 | 2/2007 | |
| JP | 2007-141971 | 6/2007 | |
| JP | 2011-515841 | 5/2011 | |
| KR | 10-0417093 | 6/1997 | |
| KR | 10-1998-087485 | 12/1998 | |
| KR | 1998-0084215 A | 12/1998 | |
| KR | 10-1999-0057943 A | 7/1999 | |
| KR | 2000-0005660 | 1/2000 | |
| KR | 10-2000-0028830 A | 5/2000 | |
| KR | 10-2002-0034313 | 5/2002 | |
| KR | 10-2002-0070777 | 9/2002 | |
| KR | 2003-0022006 | 3/2003 | |
| KR | 2004-0005609 | 1/2004 | |
| KR | 10-2005-0030347 A | 3/2005 | |
| KR | 2005-0037965 A | 4/2005 | |
| KR | 2006-0108233 A | 10/2006 | |
| TW | 386288 | 4/2000 | |
| TW | 200709309 | 3/2007 | |

(56) References Cited

FOREIGN PATENT DOCUMENTS

| TW | 200709565 | | 3/2007 |
|---|---|---|---|
| TW | 200811704 | A | 3/2008 |
| TW | 200947567 | A | 11/2009 |
| WO | WO 2005/104356 | | 11/2005 |
| WO | WO 2006/014849 | | 2/2006 |
| WO | WO 2006/052738 | | 5/2006 |
| WO | WO 2006/090445 | | 8/2006 |
| WO | WO 2007/014053 | | 2/2007 |
| WO | WO 2007/103587 | | 9/2007 |

OTHER PUBLICATIONS

Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476, Dec. 10, 1995.
Axelrad et al. "Efficient Full-Chip Yield Analysis Methodology for OPC-Corrected VLSI Design", 2000, International Symposium on Quality Electronic Design (ISQED), Mar. 20, 2000.
Balasinski et al. "Impact of Subwavelength CD Tolerance on Device Performance", 2002, SPIE vol. 4692, Jul. 11, 2002.
Burkhardt, et al., "Dark Field Double Dipole Lithography (DDL) for Back-End-of-Line Processes", 2007, SPIE Proceeding Series, vol. 6520; Mar. 26, 2007.
Capetti, et al., "Sub k1=0.25 Lithography with Double Patterning Technique for 45nm Technology Node Flash Memory Devices at λ=193nm", 2007, SPIE Proceeding Series, vol. 6520; Mar. 27, 2007.
Capodieci, L., et al., "Toward a Methodology for Manufacturability-Driven Design Rule Exploration," DAC 2004, Jun. 7, 2004, San Diego, CA.
Chandra, et al., "An Interconnect Channel Design Methodology for High Performance Integrated Circuits", 2004, IEEE, Carnegie Mellon University, pp. 1-6, Feb. 16, 2004.
Cheng, et al., "Feasibility Study of Splitting Pitch Technology on 45nm Contact Patterning with 0.93 NA", 2007, SPIE Proceeding Series, vol. 6520; Feb. 25, 2007.
Chow, et al., "The Design of a SRAM-Based Field-Programmable Gate Array—Part II: Circuit Design and Layout", 1999, IEEE, vol. 7 # 3 pp. 321-330, Sep. 1, 1999.
Clark et al. "Managing Standby and Active Mode Leakage Power in Deep Sub-Micron Design", Aug. 9, 2004, ACM.
Cobb et al. "Using OPC to Optimize for Image Slope and Improve Process Window", 2003, SPIE vol. 5130, Apr. 16, 2003.
Devgan "Leakage Issues in IC Design: Part 3", 2003, ICCAD, Nov. 9, 2003.
DeVor, et al., "Statistical Quality Design and Control", 1992, Macmillan Publishing Company, pp. 264-267, Jan. 3, 1992.
Dictionary.com, "channel," in Collins English Dictionary—Complete & Unabridged 10th Edition. Source location: HarperCollins Publishers. Sep. 3, 2009.
Dusa, et al. "Pitch Doubling Through Dual Patterning Lithography Challenges in Integration and Litho Budgets", 2007, SPIE Proceeding Series, vol. 6520; Feb. 25, 2007.
El-Gamal, "Fast, Cheap and Under Control: The Next Implementation Fabric", Jun. 2, 2003, ACM Press, pp. 354-355.
Firedberg, et al., "Modeling Within-Field Gate Length Spatial Variation for Process-Design Co-Optimization," 2005 Proc. of SPIE vol. 5756, pp. 178-188, Feb. 27, 2005.
Frankel, "Quantum State Control Interference Lithography and Trim Double Patterning for 32-16nm Lithography", 2007, SPIE Proceeding Series, vol. 6520; Feb. 27, 2007.
Garg, et al. "Lithography Driven Layout Design", 2005, IEEE VLSI Design 2005, Jan. 3, 2005.
Grobman et al. "Reticle Enhancement Technology Trends: Resource and Manufacturability Implications for the Implementation of Physical Designs" Apr. 1, 2001, ACM.
Grobman et al. "Reticle Enhancement Technology: Implications and Challenges for Physical Design" Jun. 18, 2001, ACM.
Gupta et al. "Enhanced Resist and Etch CD Control by Design Perturbation", Oct. 4, 2006, Society of Photo-Optical Instrumentation Engineers.
Gupta et al. "A Practical Transistor-Level Dual Threshold Voltage Assignment Methodology", 2005, Sixth International Symposium on Quality Electronic Design (ISQED), Mar. 21, 2005.
Gupta et al. "Detailed Placement for Improved Depth of Focus and CD Control", 2005, ACM, Jan. 18, 2005.
Gupta et al. "Joining the Design and Mask Flows for Better and Cheaper Masks", Oct. 14, 2004, Society of Photo-Optical Instrumentation Engineers.
Gupta et al. "Manufacturing-Aware Physical Design", ICCAD 2003, Nov. 9, 2003.
Gupta et al. "Selective Gate-Length Biasing for Cost-Effective Runtime Leakage Control", Jun. 7, 2004, ACM.
Gupta et al. "Wafer Topography-Aware Optical Proximity Correction for Better DOF Margin and CD Control", Apr. 13, 2005, SPIE.
Gupta, Puneet, et al., "Manufacturing-aware Design Methodology for Assist Feature Correctness," SPIE vol. 5756, May 13, 2005.
Ha et al., "Reduction in the Mask Error Factor by Optimizing the Diffraction Order of a Scattering Bar in Lithography," Journal of the Korean Physical Society, vol. 46, No. 5, May 5, 2005, pp. 1213-1217.
Hakko, et al., "Extension of the 2D-TCC Technique to Optimize Mask Pattern Layouts," 2008 Proc. of SPIE vol. 7028, 11 pages, Apr. 16, 2008.
Halpin et al., "Detailed Placement with Net Length Constraints," Publication Year 2003, Proceedings of the 3rd IEEE International Workshop on System-on-Chip for Real-Time Applications, pp. 22-27, Jun. 30, 2003.
Hayashida, et al., "Manufacturable Local Interconnect technology Fully Compatible with Titanium Salicide Process", Jun. 11, 1991, VMIC Conference.
Heng, et al., "A VLSI Artwork Legalization Technique Base on a New Criterion of Minimum Layout Perturbation", Proceedings of 1997 International Symposium on Physical Design, pp. 116-121, Apr. 14, 1997.
Heng, et al., "Toward Through-Process Layout Quality Metrics", Mar. 3, 2005, Society of Photo-Optical Instrumentation Engineers.
Hu, et al., "Synthesis and Placement Flow for Gain-Based Programmable Regular Fabrics", Apr. 6, 2003, ACM Press, pp. 197-203.
Hur et al., "Mongrel: Hybrid Techniques for Standard Cell Placement," Publication Year 2000, IEEE/ACM International Conference on Computer Aided Design, ICCAD—2000, pp. 165-170, Nov. 5, 2000.
Hutton, et al., "A Methodology for FPGA to Structured-ASIC Synthesis and Verification", 2006, EDAA, pp. 64-69, Mar. 6, 2006.
Intel Core Microarchitecture White Paper "Introducing the 45 nm Next-Generation Intel Core Microarchitecture," Intel Corporation, 2007 (best available publication date).
Jayakumar, et al., "A Metal and VIA Maskset Programmable VLSI Design Methodology using PLAs", 2004, IEEE, pp. 590-594, Nov. 7, 2004.
Jhaveri, T. et al., Maximization of Layout Printability/Manufacturability by Extreme Layout Regularity, Proc. of the SPIE vol. 6156, Feb. 19, 2006.
Kang, S.M., Metal-Metal Matrix (M3) for High-Speed MOS VLSI Layout, IEEE Trans. on CAD, vol. CAD-6, No. 5, Sep. 1, 1987.
Kawashima, et al., "Mask Optimization for Arbitrary Patterns with 2D-TCC Resolution Enhancement Technique," 2008 Proc. of SPIE vol. 6924, 12 pages, Feb. 24, 2008.
Kheterpal, et al., "Design Methodology for IC Manufacturability Based on Regular Logic-Bricks", DAC, Jun. 13, 2005, IEEE/AMC, vol. 6520.
Kheterpal, et al., "Routing Architecture Exploration for Regular Fabrics", DAC, Jun. 7, 2004, ACM Press, pp. 204-207.
Kim, et al., "Double Exposure Using 193nm Negative Tone Photoresist", 2007, SPIE Proceeding Series, vol. 6520; Feb. 25, 2007.
Kim, et al., "Issues and Challenges of Double Patterning Lithography in DRAM", 2007, SPIE Proceeding Series, vol. 6520; Feb. 25, 2007.

(56) References Cited

OTHER PUBLICATIONS

Koorapaty, et al., "Exploring Logic Block Granularity for Regular Fabrics", 2004, IEEE, pp. 1-6, Feb. 16, 2004.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 1, 2003, Springer-Verlag, vol. 2778, pp. 426-436.
Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2, 2002, Springer-Verlag, vol. 2438 pp. 132-141.
Kuh et al., "Recent Advances in VLSI Layout," Proceedings of the IEEE, vol. 78, Issue 2, pp. 237-263, Feb. 1, 1990.
Lavin et al. "Backend DAC Flows for "Restrictive Design Rules"", 2004, IEEE, Nov. 7, 2004.
Li, et al., "A Linear-Centric Modeling Approach to Harmonic Balance Analysis", 2002, IEEE, pp. 1-6, Mar. 4, 2002.
Li, et al., "Nonlinear Distortion Analysis Via Linear-Centric Models", 2003, IEEE, pp. 897-903, Jan. 21, 2003.
Liebmann et al., "Integrating DfM Components into a Cohesive Design-to-Silicon Solution," Proc. SPIE 5756, Design and Process Integration for Microelectronic Manufacturing III, Feb. 27, 2005.
Liebmann et al., "Optimizing Style Options for Sub-Resolution Assist Features," Proc. of SPIE vol. 4346, Feb. 25, 2001, pp. 141-152.
Liebmann, et al., "High-Performance Circuit Design for the RET-Enabled 65nm Technology Node", Feb. 26, 2004, SPIE Proceeding Series, vol. 5379 pp. 20-29.
Liebmann, L. W., Layout Impact of Resolution Enhancement Techniques: Impediment or Opportunity?, International Symposium on Physical Design, Apr. 6, 2003.
Liu et al., "Double Patterning with Multilayer Hard Mask Shrinkage for Sub 0.25 k1 Lithography," Proc. SPIE 6520, Optical Microlithography XX, Feb. 25, 2007.
Mansfield et al., "Lithographic Comparison of Assist Feature Design Strategies," Proc. of SPIE vol. 4000, Feb. 27, 2000, pp. 63-76.
Miller, "Manufacturing-Aware Design Helps Boost IC Yield", Sep. 9, 2004, http://www.eetimes.com/showArticle.jhtml?articleID=47102054.
Mishra, P., et al., "FinFET Circuit Design," Nanoelectronic Circuit Design, pp. 23-54, Dec. 21, 2010.
Mo, et al., "Checkerboard: A Regular Structure and its Synthesis, International Workshop on Logic and Synthesis", Department of Electrical Engineering and Computer Sciences, UC Berkeley, California, pp. 1-7, Jun. 1, 2003.
Mo, et al., "PLA-Based Regular Structures and Their Synthesis", Department of Electrical Engineering and Computer Sciences, IEEE, pp. 723-729, Jun. 1, 2003.
Mo, et al., "Regular Fabrics in Deep Sub-Micron Integrated-Circuit Design", Kluwer Academic Publishers, Jun. 1, 2002, 3 pages available.
Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.
Mutoh et al. "1-V Power Supply High-Speed Digital Circuit Technology with Multithreshold-Voltage CMOS", 1995, IEEE, Aug. 1, 1995.
Op de Beek, et al., "Manufacturability issues with Double Patterning for 50nm half pitch damascene applications, using RELACS® shrink and corresponding OPC", 2007, SPIE Proceeding Series, vol. 6520; Feb. 25, 2007.
Or-Bach, "Programmable Circuit Fabrics", Sep. 18, 2001, e-ASIC, pp. 1-36.
Otten, et al., "Planning for Performance", DAC 1998, ACM Inc., pp. 122-127, Jun. 15, 1998.
Pack et al. "Physical & Timing Verification of Subwavelength-Scale Designs—Part I: Lithography Impact on MOSFETs", 2003, SPIE vol. 5042, Feb. 23, 2003.
Pandini, et al., "Congestion-Aware Logic Synthesis", 2002, IEEE, pp. 1-8, Mar. 4, 2002.
Pandini, et al., "Understanding and Addressing the Impact of Wiring Congestion During Technology Mapping", ISPD Apr. 7, 2002, ACM Press, pp. 131-136.
Patel, et al., "An Architectural Exploration of Via Patterned Gate Arrays, ISPD 2003", Apr. 6, 2003, pp. 184-189.
Pham, D., et al., "FINFET Device Junction Formation Challenges," 2006 International Workshop on Junction Technology, pp. 73-77, Aug. 1, 2006.
Pileggi, et al., "Exploring Regular Fabrics to Optimize the Performance-Cost Trade-Offs, Proceedings of the 40th ACM/IEEE Design Automation Conference (DAC) 2003", Jun. 2, 2003, ACM Press, pp. 782-787.
Poonawala, et al., "ILT for Double Exposure Lithography with Conventional and Novel Materials", 2007, SPIE Proceeding Series, vol. 6520; Feb. 25, 2007.
Qian et al. "Advanced Physical Models for Mask Data Verification and Impacts on Physical Layout Synthesis" 2003 IEEE, Mar. 24, 2003.
Ran, et al., "An Integrated Design Flow for a Via-Configurable Gate Array", 2004, IEEE, pp. 582-589, Nov. 7, 2004.
Ran, et al., "Designing a Via-Configurable Regular Fabric", Custom Integrated Circuits Conference (CICC). Proceedings of the IEEE, Oct. 1, 2004, pp. 423-426.
Ran, et al., "On Designing Via-Configurable Cell Blocks for Regular Fabrics" Proceedings of the Design Automation Conference (DAC) 2004, Jun. 7, 2004, ACM Press, s 198-203.
Ran, et al., "The Magic of a Via-Configurable Regular Fabric", Proceedings of the IEEE International Conference on Computer Design (ICCD) Oct. 11, 2004.
Ran, et al., "Via-Configurable Routing Architectures and Fast Design Mappability Estimation for Regular Fabrics", 2005, IEEE, pp. 25-32, Sep. 1, 2006.
Reis, et al., "Physical Design Methodologies for Performance Predictability and Manufacturability", Apr. 14, 2004, ACM Press, pp. 390-397.
Robertson, et al., "The Modeling of Double Patterning Lithographic Processes", 2007, SPIE Proceeding Series, vol. 6520; Feb. 25, 2007.
Rosenbluth, et al., "Optimum Mask and Source Patterns to Print a Given Shape," 2001 Proc. of SPIE vol. 4346, pp. 486-502, Feb. 25, 2001.
Rovner, "Design for Manufacturability in Via Programmable Gate Arrays", May 1, 2003, Graduate School of Carnegie Mellon University.
Sengupta, "An Integrated CAD Framework Linking VLSI Layout Editors and Process Simulators", 1998, Thesis for Rice University, pp. 1-101, Nov. 1, 1998.
Sengupta, et al., "An Integrated CAD Framework Linking VLSI Layout Editors and Process Simulators", 1996, SPIE Proceeding Series, vol. 2726; pp. 244-252, Mar. 10, 1996.
Sherlekar, "Design Considerations for Regular Fabrics", Apr. 18, 2004, ACM Press, pp. 97-102.
Shi et al., "Understanding the Forbidden Pitch and Assist Feature Placement," Proc. of SPIE vol. 4562, pp. 968-979, Mar. 11, 2002.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Socha, et al., "Simultaneous Source Mask Optimization (SMO)," 2005 Proc. of SPIE vol. 5853, pp. 180-193, Apr. 13, 2005.
Sreedhar et al. "Statistical Yield Modeling for Sub-Wavelength Lithography", 2008 IEEE, Oct. 28, 2008.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7, 2004, ACM Press, pp. 874-877.
Tian et al. "Model-Based Dummy Feature Placement for Oxide Chemical_Mechanical Polishing Manufacturability" IEEE, vol. 20, Issue 7, Jul. 1, 2001, pp. 667-670.

(56) References Cited

OTHER PUBLICATIONS

Tong, et al., "Regular Logic Fabrics for a Via Patterned Gate Array (VPGA), Custom Integrated Circuits Conference", Sep. 21, 2003, Proceedings of the IEEE, pp. 53-56.
Vanleenhove, et al., "A Litho-Only Approach to Double Patterning", 2007, SPIE Proceeding Series, vol. 6520; Feb. 25, 2007, 10 pages.
Wang, et al., "Performance Optimization for Gridded-Layout Standard Cells", vol. 5567 SPIE, Sep. 13, 2004.
Wang, J. et al., Standard Cell Layout with Regular Contact Placement, IEEE Trans. on Semicon. Mfg., vol. 17, No. 3, Aug. 9, 2004, pp. 375-383.
Webb, Clair, "45nm Design for Manufacturing," Intel Technology Journal, vol. 12, Issue 02, Jun. 17, 2008, ISSN 1535-864X, pp. 121-130.
Webb, Clair, "Layout Rule Trends and Affect upon CPU Design", vol. 6156 SPIE, Feb. 19, 2006.
Wenren, et al., "The Improvement of Photolithographic Fidelity of Two-dimensional Structures Though Double Exposure Method", 2007, SPIE Proceeding Series, vol. 6520; Feb. 25, 2007.
Wilcox, et al., "Design for Manufacturability: A Key to Semiconductor Manufacturing Excellence", 1998 IEEE, pp. 308-313, Sep. 23, 1998.
Wong, et al., "Resolution Enhancement Techniques and Design for Manufacturability: Containing and Accounting for Variabilities in Integrated Circuit Creation," J. Micro/Nanolith. MEMS MOEMS, Sep. 27, 2007, vol. 6(3), 2 pages.
Wu, et al., "A Study of Process Window Capabilities for Two-dimensional Structures under Double Exposure Condition", 2007, SPIE Proceeding Series, vol. 6520; Feb. 25, 2007.
Xiong, et al., "The Constrained Via Minimization Problem for PCB and VLSI Design", 1988 ACM Press/IEEE, pp. 573-578, Jun. 12, 1998.
Yamamaoto, et al., "New Double Exposure Technique without Alternating Phase Shift Mask", SPIE Proceeding Series, vol. 6520; Feb. 25, 2007.
Yamazoe, et al., "Resolution Enhancement by Aerial Image Approximation with 2D-TCC," 2007 Proc. of SPIE vol. 6730, 12 pages, Sep. 17, 2007.
Yang, et al., "Interconnection Driven VLSI Module Placement Based on Quadratic Programming and Considering Congestion Using LFF Principles", 2004 IEEE, pp. 1243-1247, Jun. 27, 2004.
Yao, et al., "Multilevel Routing With Redundant Via Insertion", Oct. 23, 2006, IEEE, pp. 1148-1152.
Yu, et al., "True Process Variation Aware Optical Proximity Correction with Variational Lithography Modeling and Model Calibration," J. Micro/Nanolith. MEMS MOEMS, Sep. 11, 2007, vol. 6(3), 16 pages.
Zheng, et al."Modeling and Analysis of Regular Symmetrically Structured Power/Ground Distribution Networks", DAC, Jun. 10, 2002, ACM Press, pp. 395-398.
Zhu, et al., "A Stochastic Integral Equation Method for Modeling the Rough Surface Effect on Interconnect Capacitance", 2004 IEEE, Nov. 7, 2004.
Zhu, et al., "A Study of Double Exposure Process Design with Balanced Performance Parameters for Line/Space Applications", 2007, SPIE Proceeding Series, vol. 6520; Feb. 25, 2007.
Zuchowski, et al., "A Hybrid ASIC and FPGA Architecture", 2003 IEEE, pp. 187-194, Nov. 10, 2002.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 1, 2003.
Aubusson, Russel, "Wafer-Scale Integration of Semiconductor Memory," Apr. 1, 1979.
Bachtold, "Logic Circuits with Carbon," Nov. 9, 2001.
Baker, R. Jacob, "CMOS: Circuit Design, Layout, and Simulation (2nd Edition)," Nov. 1, 2004, table of contents only.
Baldi et al., "A Scalable Single Poly EEPROM Cell for Embedded Memory Applications," pp. 1-4, Fig. 1, Sep. 1, 1997.
Cao, Ke, "Design for Manufacturing (DFM) in Submicron VLSI Design," Aug. 1, 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable SRAM Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002, table of contents.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999, Table of Contents only.
Cowell, "Exploiting Non-Uniform Access Time," Jul. 1, 2003.
Das, Shamik, "Design Automation and Analysis of Three-Dimensional Integrated Circuits," May 1, 2004.
Dehaene, W. et al., "Technology-Aware Design of SRAM Memory Circuits," Mar. 1, 2007.
Deng, Liang et al., "Coupling-aware Dummy Metal Insertion for Lithography," p. 1, col. 2, Jan. 23, 2007.
Devoivre et al., "Validated 90nm CMOS Technology Platform with Low-k Copper Interconnects for Advanced System-on-Chip (SoC)," Jul. 12, 2002.
Enbody, R. J., "Near-Optimal n-Layer Channel Routing," Jun. 29, 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Performance Variability," p. 2, Figs. 2b-2c, May 23, 2005.
Greenway, Robert et al., "32nm 1-D Regular Pitch SRAM Bitcell Design for Interference-Assisted Lithography," Oct. 6, 2008.
Gupta et al., "Modeling Edge Placement Error Distribution in Standard Cell Library," Feb. 23, 2006.
Grad, Johannes et al., "A standard cell library for student projects," Proceedings of the 2003 IEEE International Conference on Microelectronic Systems Education, Jun. 2, 2003.
Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005, table of contents.
Hurat et al., "A Genuine Design Manufacturability Check for Designers," Feb. 19, 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," IEDM 1998, Dec. 6, 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.
Kahng, Andrew B., "Design Optimizations DAC-2006 DFM Tutorial, part V)," Jul. 24, 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Design Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.
Kuhn, Kelin J., "Reducing Variation in Advanced Logic Technologies: Approaches to Process and Design for Manufacturability of Nanoscale CMOS," p. 27, Dec. 12, 2007.

(56) References Cited

OTHER PUBLICATIONS

Kurokawa, Atsushi et al., "Dummy Filling Methods for Reducing Interconnect Capacitance and Number of Fills, Proc. of ISQED," pp. 586-591, Mar. 21, 2005.
Lavin, Mark, "Open Access Requirements from RDR Design Flows," Nov. 11, 2004.
Liebmann, Lars et al., "Layout Methodology Impact of Resolution Enhancement Techniques," pp. 5-6, Apr. 6, 2003.
Liebmann, Lars et al., "TCAD development for lithography resolution enhancement," Sep. 1, 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, Dec. 1, 2006.
MOSIS, "Design Rules MOSIS Scalable CMOS (SCMOS) (Revision 8.00)," Oct. 4, 2004.
MOSIS, "MOSIS Scalable CMOS (SCMOS) Design Rules (Revision 7.2)," Jan. 1, 1995.
Muta et al., "Manufacturability-Aware Design of Standard Cells," pp. 2686-2690, Figs. 3, 12, Dec. 1, 2007.
Na, Kee-Yeol et al., "A Novel Single Polysilicon EEPROM Cell With a Polyfinger Capacitor," Nov. 30, 2007.
Pan et al., "Redundant Via Enhanced Maze Routing for Yield Improvement," DAC 2005, Jan. 18, 2005.
Park, Tae Hong, "Characterization and Modeling of Pattern Dependencies in Copper Interconnects for Integrated Circuits," Ph.D. Thesis, MIT, May 24, 2002.
Patel, Chetan, "An Architectural Exploration of Via Patterned Gate Arrays (CMU Master's Project)," May 1, 2003.
Pease, R. Fabian et al., "Lithography and Other Patterning Techniques for Future Electronics," IEEE 2008, vol. 96, Issue 2, Jan. 16, 2008.
Serrano, Diego Emilio, Pontificia Universidad Javeriana Facultad De Ingenieria, Departamento De Electronica, "Dise,ẽo De Multiplicador 4×8 en VLSI, Introduccion al VLSI," 2006 (best available publication date).
Pramanik, "Impact of layout on variability of devices for sub 90nm technologies," 2004 (best available publication date).
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements for 90 and 65 Nm Nodes Via Simultaneous Optimization of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001, 5 pages.
Saint, Christopher et al., "IC Mask Design: Essential Layout Techniques," May 24, 2002, 6 pages.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," Jul. 24, 2006.
Spence, Chris, "Full-Chip Lithography Simulation and Design Analysis: How OPC is changing IC Design, Emerging Lithographic Technologies IX," May 6, 2005.
Subramaniam, Anupama R., "Design Rule Optimization of Regular layout for Leakage Reduction in Nanoscale Design," pp. 474-478, Mar. 24, 2008.

Tang, C. W. et al., "A compact large signal model of LDMOS," Solid-State Electronics 46(2002) 2111-2115, May 17, 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 1, 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, Jun. 6, 2001.
Torres, J. A. et al., "RET Compliant Cell Generation for sub-130nm Processes," SPIE vol. 4692, Mar. 6, 2002.
Uyemura, John P., "Introduction to VLSI Circuits and Systems," Jul. 30, 2001, table of contents only.
Uyemura, John, "Chip Design for Submicron VLIS: CMOS Layout and Simulation," Feb. 8, 2005, table of contents only.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," Jul. 28, 2006.
Wang, Dunwei et al., "Complementary Symmetry Silicon Nanowire Logic: Power-Efficient Inverters with Gain," Aug. 17, 2006.
Wang, Jun et al., "Effects of grid-placed contacts on circuit performance," pp. 135-139, Figs. 2, 4-8, Feb. 28, 2003.
Wang, Jun et al., "Standard cell design with regularly placed contacts and gates (SPIE vol. 5379)," Feb. 22, 2004.
Wang, Jun et al., "Standard cell design with resolution-enhancement-technique-driven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, Jul. 16, 2007.
Weste, Neil et al., "CMOS VLSI Design: A Circuits and Systems Perspective, 3rd Edition," May 21, 2004, table of contents only.
Wingerden, Johannes van, "Experimental verification of improved printability for litho-driven designs," Mar. 14, 2005.
Wong, Alfred K., "Microlithography: Trends, Challenges, Solutions and Their Impact on Design," Micro IEEE vol. 23, Issue 2, Apr. 29, 2003.
Xu, Gang, "Redundant-Via Enhanced Maze Routing for Yield Improvement," Proceedings of ASP-DAC 2005, Jan. 18, 2005.
Yang, Jie, "Manufacturability Aware Design," pp. 93, 102, Fig. 5.2, Jan. 16, 2008.
Yongshun, Wang et al., "Static Induction Devices with Planar Type Buried Gate," Chinese Journal of Semiconductors, vol. 25, No. 2, Feb. 1, 2004.
Zobrist, George (editor), "Progress in Computer Aided VLSI Design: Implementations (Ch. 5)," Ablex Publishing Corporation, Feb. 1, 1990, table of contents only.
Petley, Graham, "VLSI and ASIC Technology Standard Cell Library Design," from website www.vlsitechnology.org, Jan. 11, 2005.
Liebmann, Lars, et al., "Layout Optimization at the Pinnacle of Optical Lithography," Design and Process Integration for Microelectronic Manufacturing II, Proceedings of SPIE vol. 5042, Jul. 8, 2003.
Kawasaki, H., et al., "Challenges and Solutions of FinFET Integration in an SRAM Cell and a Logic Circuit for 22 nm node and beyond," Electron Devices Meeting (IEDM), 2009 IEEE International, IEEE, Piscataway, NJ, USA, Dec. 7, 2009, pp. 1-4.

* cited by examiner

US 9,589,091 B2

1
SCALABLE META-DATA OBJECTS

CLAIM OF PRIORITY

This application is also a continuation application under 35 U.S.C. 120 of prior U.S. application Ser. No. 13/312,673, filed Dec. 6, 2011, which claims priority under 35 U.S.C. 119(e) to U.S. Provisional Patent Application No. 61/420,313, filed Dec. 6, 2010. The disclosure of each above-identified patent application is incorporated herein by reference in its entirety.

BACKGROUND

Currently, integrated circuit (IC) layout is represented by polygons in standard formats like GDS-II (Graphic Data System) and OASIS (Open Artwork System Interchange Standard). Re-use of IC layout has been desired for many years. Because of technology scaling, re-use of IC layout has been limited or not possible. Therefore, the IC layout polygons need to be redrawn each time a technology changes, for example moving to smaller dimensions.

The Mead and Conway "lambda" rules were an early attempt at scaling, but were not useful outside an academic environment. None of these layout representations comprehend different interconnect structures as circuits scale. Two significant problems with scaling include:
1. Lithographic resolution is scaling at a different rate from overlay scaling, and
2. Device and interconnect structures change because of material properties and/or electric field requirements.

It is within this context that the present invention arises.

SUMMARY

In one embodiment, a method is disclosed for defining an integrated circuit. The method includes generating a digital data file that includes both electrical connection information for a number of circuit components and physical topology information for the number of circuit components. The method also includes operating a computer to execute a layout generation program. The layout generation program reads the electrical connection information and physical topology information for each of the number of circuit components from the digital data file and automatically creates one or more layout structures necessary to form each of the number of circuit components in a semiconductor device fabrication process, such that the one or more layout structures comply with the physical topology information read from the digital data file. The method further includes operating the computer to store the one or more layout structures necessary to form each of the number of circuit components in a digital format on a computer readable medium.

In one embodiment, a system for defining an integrated circuit is disclosed. The system includes a computer system including a processor and a memory. The system also includes a digital data file stored in the memory. The digital data file includes both electrical connection information for a number of circuit components and physical topology information for the number of circuit components. The system also includes a layout generation program stored as a set of computer executable instructions in the memory. The layout generation program is defined to read the electrical connection information and physical topology information for each of the number of circuit components from the digital data file and automatically create a digital representation of one or more layout structures necessary to form each of the number of circuit components in a semiconductor device fabrication process, such that the one or more layout structures comply with the physical topology information read from the digital data file. The layout generation program is further defined to store the digital representation of the one or more automatically created layout structures in a digital format on a computer readable medium.

Other aspects and advantages of the invention will become more apparent from the following detailed description, taken in conjunction with the accompanying drawings, illustrating by way of example the present invention.

DETAILED DESCRIPTION

Figure 1:
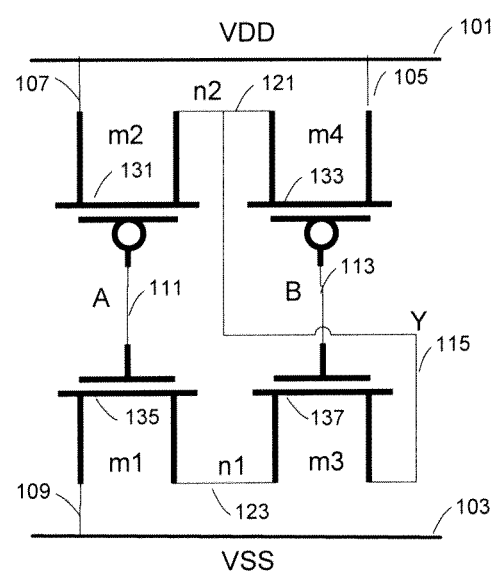
FIG. 1 shows a topological schematic view of the two input NAND gate of Table 2, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

By way of example, the invention described herein can use the Tela Innovations, Inc., Dynamic Array Architecture (i.e., gridded design style), as described in U.S. Pat. Nos. 7,446,352 and 7,917,879, each of which is incorporated herein by reference in its entirety. However, it should be understood that the invention is not limited to the Dynamic Array Architecture design style. Also, CMOS transistors are used in the examples described herein, but it should be understood that other components can be handled in an analogous fashion. It should also be noted that the Dynamic Array Architecture can be implemented with a coarse grid in the "x" and "y" directions to facilitate identification of the locations of objects like transistors, contacts, and gaps in lines, i.e., linear conductive structures. The linear conductive structures can be positioned on and/or according to the grids.

Embodiments of the present invention can provide the following:

a. A data format which is similar to a SPICE netlist but which includes information on where devices are and how they are connected.

b. A tool, e.g., computer program, which can implement a different device or interconnect technology driven by a technology file input. The tool can be defined as computer executable code stored on a computer readable medium.

c. An output of the tool which includes design intent information to allow further modification to the layout after cells are placed into a hierarchy such as a block of logic cells.

d. A tool which can take the design intent information and revise final layout to improve manufacturability. The tool can be defined as computer executable code stored on a computer readable medium.

Table 1 shows a portion of a SPICE netlist, listing the lines needed for a two input NAND gate identified as a sub-circuit. On the first line, a name is specified for the sub-circuit, followed by identification of input, output, and power supply pins. The four transistors used are identified with one in each line. The SPICE convention for a MOS transistor is "name Drain Gate Source Bulk Model-name Width Length." Other parameters can also be included. The 4 nodes of the transistor are in the order DGSB.

TABLE 1

```
.subckt t10__nd2d1 a b y vdd vss
m1 n1 a vss vss nmos w=160n l=20n
m2 y  a vdd vdd pmos w=192n l=20n
m3 y  b n1 vss nmos w=160n l=20n
m4 y  b vdd vdd pmos w=192n l=20n
.ends
```

The netlist of Table 1 is an example, using MOS transistors. Other components like resistors, diodes, bipolar transistors, and MOS transistors with other model names (e.g., to represent transistors with different threshold voltages) can be expected and handled in the same fashion.

It should be noted that each of the input, output, and power supply pins are connected to nodes of transistors as needed to perform the circuit function. In the example of Table 1, there is one internal node, n1, which has no connection outside the sub-circuit.

The netlist describes a circuit topology that is quite universal. However, having fixed values for the length and width parameters within the netlist circuit topology limits the scalability of the NAND sub-circuit. The length and width parameters can be replaced by variable values or expressions which are controlled by global parameters within the complete SPICE deck. Also, a similar Verilog-AMS netlist could be used, since it would contain a representation of the components and the topological connections of the nodes.

In one embodiment of the present invention the SPICE netlist is extended to include additional information for generating a physical topology from the circuit topology. Table 2 shows an example netlist for the two input NAND gate including possible extensions for generating the physical topology, in accordance with one embodiment of the present invention. The initial comments in the netlist explain the new syntax.

TABLE 2

```
* Transistor width in units of metal-1 pitch / 4
* Transistor length in units of the minimum
* X values in units of poly tracks (not counting edge dummy poly)
* Y values for transistor center in units of metal-1 pitch / 4
* Y values for drain, gate, source connections in units of metal pitch
* Transistor type: 0 - (00) no extension past the centerline in X
* Transistor type: 1 - (01) extension on the right
* Transistor type: 2 - (10) extension on the left
* Transistor type: 3 - (11) extension on both sides
.subckt t10__nd2d1__s a b y vdd vss
m1 n1 a vss vss nmos $w=8  $l=1 $x=1 $y=10          $yg=5#  $ys=1   $type=2
m2 y  a vdd vdd pmos $w=10 $l=1 $x=1 $y=33                  $ys=11  $type=2
m3 y  b n1 vss nmos  $w=8  $l=1 $x=2 $y=10 $yd=3    $yg=7#          $type=1
m4 y  b vdd vdd pmos $w=10 $l=1 $x=2 $y=33 $yd=9#           $ys=11  $type=1
.ends
```

It should be noted that width could be in some other simple unit of metal-1 pitch, for example ⅛ or ⅕ of the metal-1 pitch. Also, the length could be specified as coded values. For example, a netlist could specify $l=A for several transistors, and $l=B for other transistors, and $l=C for yet other transistors. The layout generator would use the technology file to build the layout using the appropriate sizes. For example, in one example embodiment, at a 45 nm (nanometer) CMOS technology node, A=40 nm, B=42 nm, C=44 nm. These specific values would exist in the technology file, so the meta-data netlist is still technology independent. In one example embodiment, the A, B, C values of length could be used in variant logic cells needed for power optimization.

FIG. 1 shows a topological schematic view of the two input NAND gate of Table 2, in accordance with one embodiment of the present invention. Input pin A is 111. Input pin B is 113. Output pin Y is 115 and is connected to internal node n2, which is 121. VDD is 101. VSS is 103. Internal node n1 is 123. Transistor m1 is 135, and is connected to VSS by connection 109, and is further connected to internal node n1 123. Transistor m2 is 131, and is connected to VDD by connection 107, and is further connected to both internal node n2 121 and output pin Y 115. Transistor m3 is 137, and is connected to internal node n1 123, and is further connected to both output pin Y 115 and internal node n2 121. Transistor m4 is 133, and is connected to VDD by connection 105, and is further connected to both internal node n2 121 and output pin Y 115.

Figure 2:
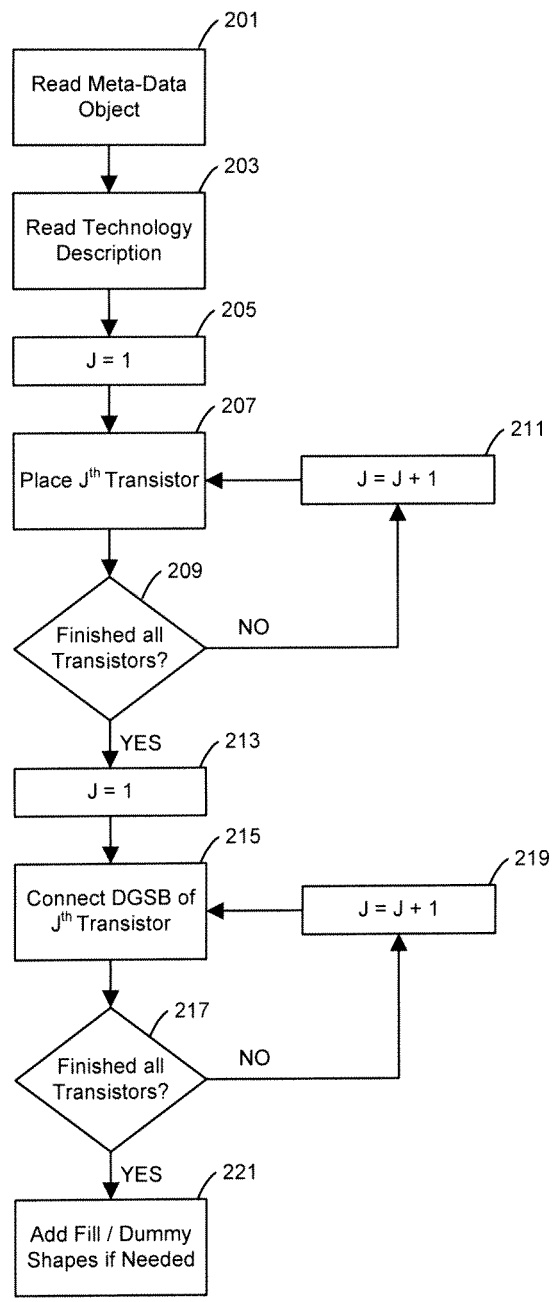
FIG. 2 shows a flow chart of a method for generating a physical layout from meta-data input, in accordance with one embodiment of the present invention.

FIG. 2 shows a flow chart of a method for generating a physical layout from meta-data input, in accordance with one embodiment of the present invention. The method of FIG. 2 can be implemented by a tool (e.g., computer program) which reads meta-data object input, and combines the meta-data object input with information from a technology file to create a physical layout. Because essentially any circuit is formed by components attached to nodes which are interconnected, the method of FIG. 2 is not limited to CMOS devices. In general, the method of FIG. 2 can be applied to any mapping of a topology of elements, nodes, and interconnect into another representation (e.g., into a physical representation) of the same electrical topology.

The method includes an operation 201 for reading the meta-data object. The method proceeds with an operation 203 for reading the technology description, such as that provided by information within a technology file. The method then proceeds with an initialization operation 205 to set a counter variable "J" equal to one. In an operation 207, the transistor corresponding to the current counter value, i.e., the J-th transistor, is placed in the layout. Then, a decision operation 209 is performed to determine whether or not all transistors have been placed in the layout. If more transistors need to be placed in the layout, the method proceeds from the decision operation 209 to an operation 211, in which the counter variable "J" is incremented by one. Then, the method proceeds back to operation 207 for placing the current (J-th) transistor. If decision operation 209 determines that all transistors have been placed in the layout, the method proceeds from decision operation 209 to an operation 213, in which the variable counter is reset to one.

Operation 213 is the beginning of the interconnection of nodes. From the operation 213, the method proceeds with an operation 215 for connecting DGSB (Drain, Gate, Source, Bulk) of the current transistor as identified by the counter variable J (i.e., the J-th transistor). Then, a decision operation 217 is performed to determine whether or not DGSB has been connected for all transistors. If more transistors need to be DGSB connected in the layout, the method proceeds from the decision operation 217 to an operation 219, in which the counter variable "J" is incremented by one. Then, the method proceeds back to operation 215 for connecting DGSB of the current (J-th) transistor. If decision operation 217 determines that all transistors have been DGSB connected in the layout, the method proceeds from decision operation 217 to an operation 221, in which fill and/or dummy shapes are added to the layout, if necessary.

Figure 3:
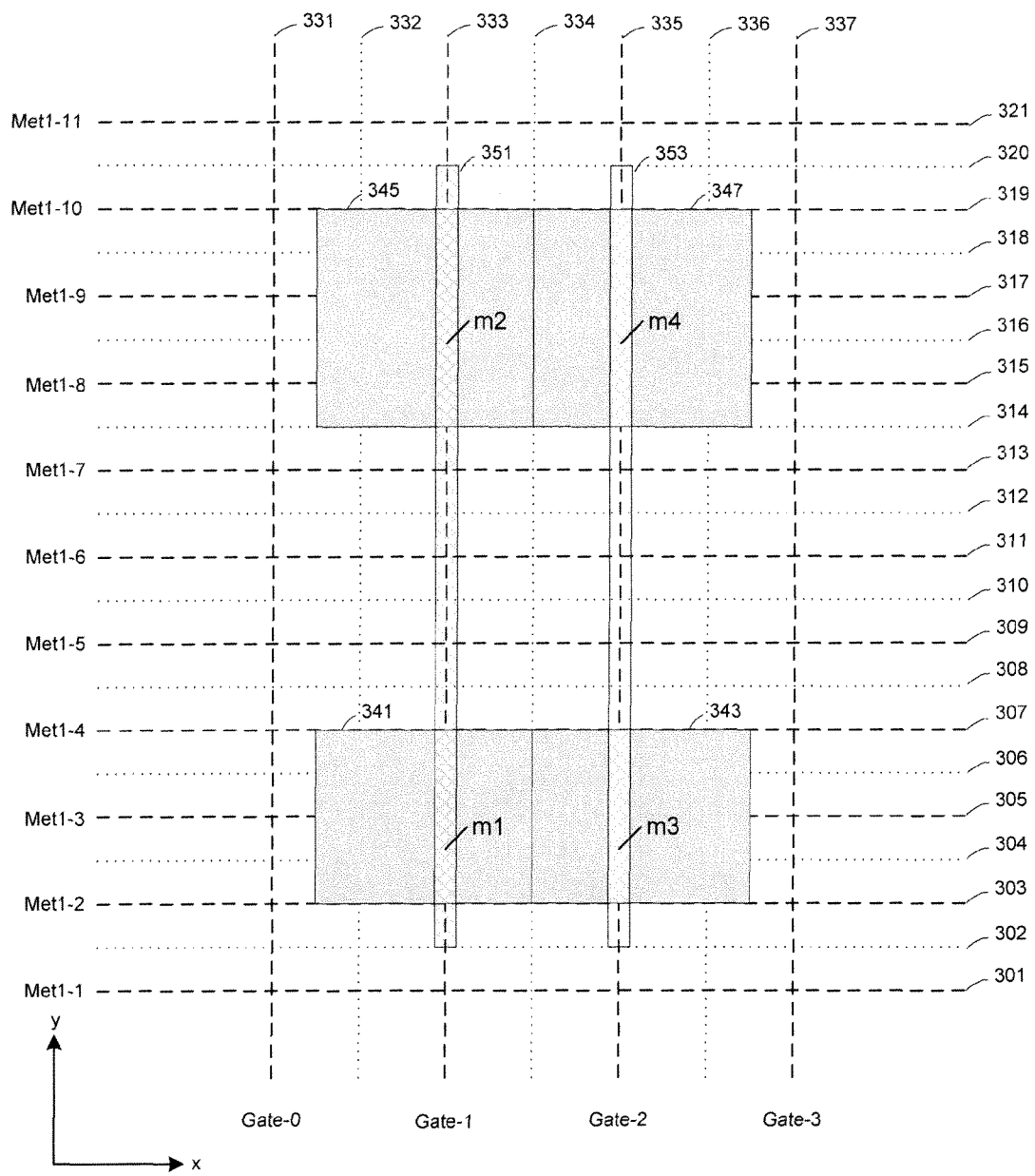
FIG. 3 shows a plan view of the two input NAND gate of Table 2 and FIG. 1 with the placements of the diffusion (345, 347, 341, 343) and linear conductive structures (351, 353) that form gate electrodes of the four transistors m1, m2, m3, m4, in accordance with one embodiment of the present invention.

FIG. 3 shows a plan view of the two input NAND gate of Table 2 and FIG. 1 with the placements of the diffusion (345, 347, 341, 343) and linear conductive structures (351, 353) that form gate electrodes of the four transistors m1, m2, m3, m4, in accordance with one embodiment of the present invention. Also, FIG. 3 shows the output of the layout generator of the method of FIG. 2, as applied to the two input NAND gate, just prior to operation 213. In this example, the layout generator has found four transistors (m1, m2, m3, m4) and placed their centers at the coordinates specified by the meta-data. Note that the diffusions (345, 347, 341, 343) have been extended past the gate-space centerlines depending on the "type" of the transistor diffusion or "active" region. Also note that the linear conductive structures (351, 353) have been extended vertically across the cell since the gate electrodes of transistors m1 and m2 share linear conductive structure 351, and the gate electrodes of transistors m3 and m4 share linear conductive structure 353. Also, an x-y grid defined by x-direction lines 301-321 and y-direction lines 331-337 is shown in FIG. 3 to aid visualizing where the physical elements will be placed.

Figure 4:
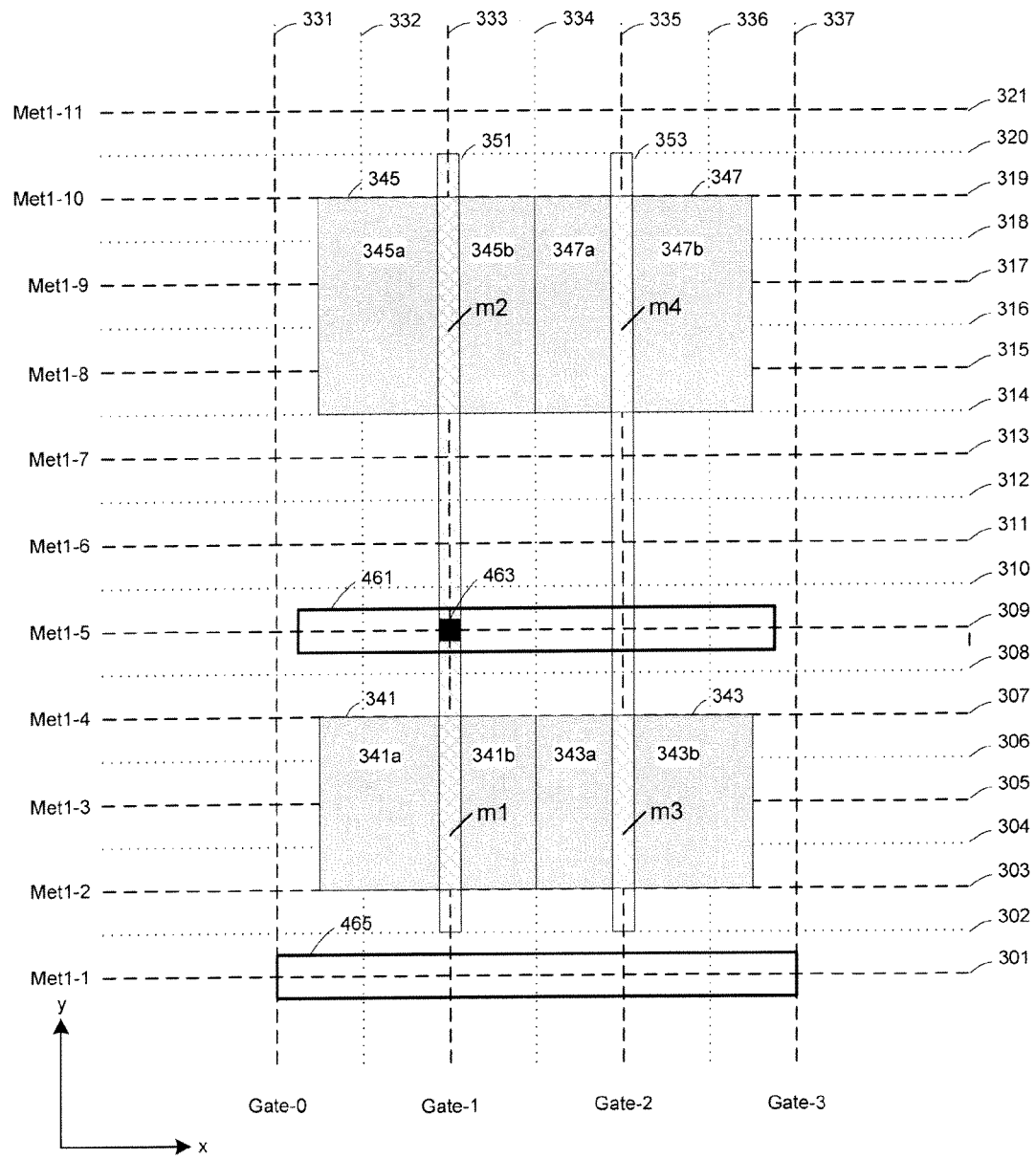
FIG. 4 shows a plan view of the two input NAND gate with the addition of a VSS rail 465, and a gate connection formed by a gate contact 463 and a metal-1 structure 461, in accordance with one embodiment of the present invention.

During the first pass through operation 215 of the method of FIG. 2, the layout generator begins making the connections for transistor m1. FIG. 4 shows a plan view of the two input NAND gate with the addition of a VSS rail 465, and a gate connection formed by a gate contact 463 and a metal-1 structure 461, in accordance with one embodiment of the present invention. The drain 341b of transistor m1 is connected by diffusion to the source 343a of transistor m3, so nothing needs to be added for connection of the drain 341 of transistor m1. The gate of transistor m1 is contacted by metal-1 line 5 (Met1-5), so the contact 463 and metal-1 structure 461 are placed into the layout as shown in FIG. 4. The horizontal dimension of the metal-1 structure 461 is determined by both the technology file physical rules as well as the technology file guidelines. such as "metal-1 line used for a cell pin must cross at least 2 metal-2 tracks."

The source 341a of transistor m1 is connected to VSS, which is defined in the technology file as a metal-1 structure in the bottom track (Met1-1). This is illustrated as VSS rail 465 in FIG. 4. To allow scalability, the power supply connection is technology dependent.

Figure 5:
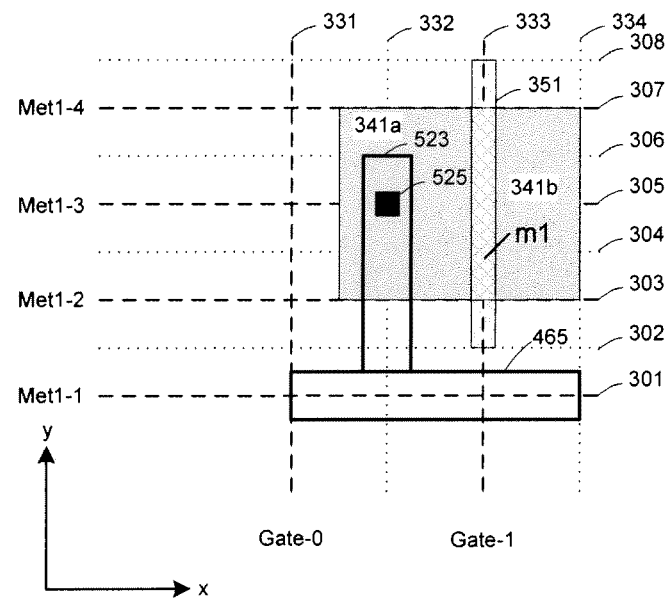
FIG. 5 shows a portion of the plan view of the two input NAND gate with a VSS connection to the transistor m1 done with a metal-1 vertical structure 523 and a diffusion contact 525, in accordance with one embodiment of the present invention.

FIG. 5 shows a portion of the plan view of the two input NAND gate with a VSS connection to the transistor m1 done with a metal-1 vertical structure 523 and a diffusion contact 525, in accordance with one embodiment of the present invention. The metal-1 structure 523 is a vertical stub from metal-1 structure 465. The diffusion contact 525 connects the metal-1 structure 523 to the diffusion region 341a. This metal-1 construction may be allowed in technologies of 32 nm and larger, but may not be allowed for smaller technology nodes because of the difficulty in making the bend in the metal-1 pattern.

Figure 6:
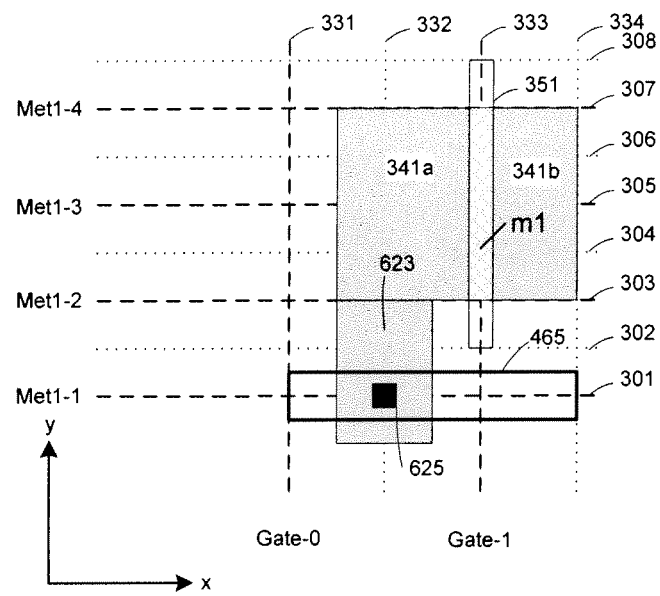
FIG. 6 shows a portion of the plan view of the two input NAND gate with a VSS connection to the transistor m1 done with a diffusion structure 623 and a diffusion contact 625, in accordance with one embodiment of the present invention.

FIG. 6 shows a portion of the plan view of the two input NAND gate with a VSS connection to the transistor m1 done with a diffusion structure 623 and a diffusion contact 625, in accordance with one embodiment of the present invention. The diffusion structure 623 is contiguous with the diffusion region 341a. The diffusion contact 625 extends vertically to connect with both the diffusion structure 623 and the metal-1 structure 465. This metal-1 construction may be allowed in technologies of 40 nm and larger, but may not be allowed for smaller technology nodes because of the difficulty in making the bend in the diffusion pattern.

Figure 7:
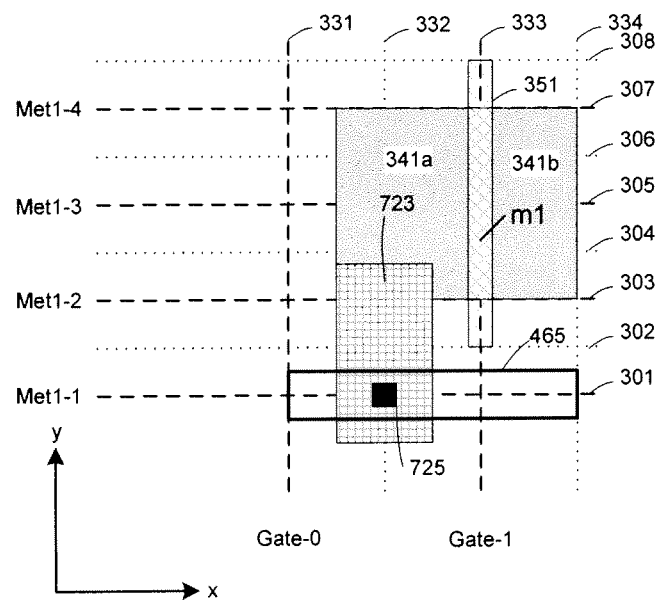
FIG. 7 shows a portion of the plan view of the two input NAND gate with a VSS connection to the transistor m1 done with a local-interconnect structure 723 and a contact structure 725, in accordance with one embodiment of the present invention.

FIG. 7 shows a portion of the plan view of the two input NAND gate with a VSS connection to the transistor m1 done with a local-interconnect structure 723 and a contact structure 725, in accordance with one embodiment of the present invention. The local-interconnect structure 723 is electrically connected to the diffusion region 341a. The contact structure 725 extends vertically to connect with both the local-interconnect structure 723 and the metal-1 structure 465. This construction is highly scalable since it involves a simple rectangular pattern for the local-interconnect structure 723. Additionally, in one embodiment, the local-interconnect structure 723 can be self-aligned to the gate electrodes or photo-aligned to create the pattern shown in FIG. 7.

Figure 8:
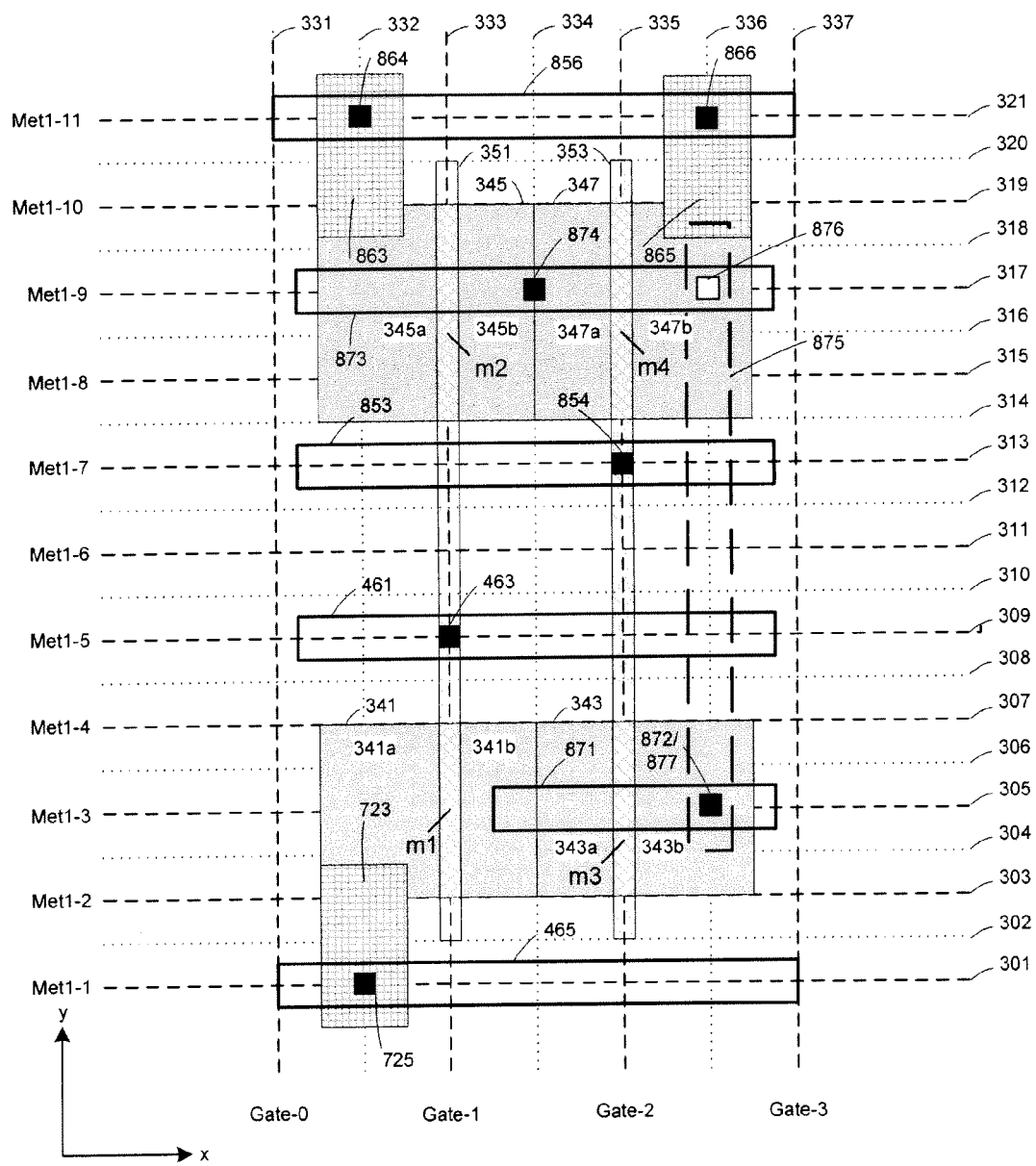
FIG. 8 shows a plan view of the two input NAND gate with all the connections made, in accordance with one embodiment of the present invention.

It should be understood that a similar set of technology dependent power supply connections can be created in the same fashion as exemplified in FIGS. 5-7 for other nodes identified in the meta-data. For instance, FIG. 8 shows a plan view of the two input NAND gate with all the connections made, in accordance with one embodiment of the present invention. In the example of FIG. 8, local interconnect is used to connect the power rails to the transistors m1, m2, and m4. FIG. 7 shows the local-interconnect connection between VSS rail 465 and transistor m1. Diffusion region 345a of transistor m2 is connected by local-interconnect structure 863 and contact structure 864 to VDD structure 856. Similarly, diffusion region 347b of transistor m4 is connected by local-interconnect structure 865 and contact structure 866 to VDD structure 856.

Also, the gates of transistors m3 and m4 are connected to metal-1 structure 853 by gate contact 854. The metal-1 structure 853 is connected to input pin B 113. Similarly, the gates of transistors m1 and m2 are connected to metal-1 structure 461 by gate contact 463. The metal-1 structure 461 is connected to input pin A 111.

Drain nodes of transistors m3, m2, and m4 are tied to metal-1 lines 3 and 9, i.e., Met1-3 and Met1-9, and are listed in the meta-data. The diffusion region 343b of transistor m3 is connected to the shared diffusion node of transistors m2 and m4 (formed by diffusion regions 345b and 347a), by connections through both metal-1 and metal-2 structures. Specifically, the diffusion region 343b is connected to the metal-1 structure 871 by diffusion contact 872. The metal-1 structure 871 is in turn connected to the metal-2 structure 875 by via 877. The diffusion contact 872 and via 877 is a stacked contact/via structure. The metal-2 structure 875 is connected to the metal-1 structure 873 by via 876. The metal-1 structure 873 is connected to the shared diffusion node (formed by diffusion regions 345b and 347a) by diffusion contact 874. The connection between the diffusion region 343b of transistor m3 and the shared diffusion node of transistors m2 and m4 (formed by diffusion regions 345b and 347a) is connected to the output pin Y 115.

It should be appreciated that the layout generator for the technology file in the example of FIG. 8 used a metal-2 jumper and chose the available track 336 to form the above-described output connection. In another embodiment, the layout generator could have used track 334 for the metal-2 jumper in the output connection. In yet another embodiment, the layout generator could have chosen to not put a hard metal-2 structure in the layout for the output connection, but could have put a "must connect" instruction in the .LEF file to complete the connection with a metal-2 track available to the router.

Figure 9:
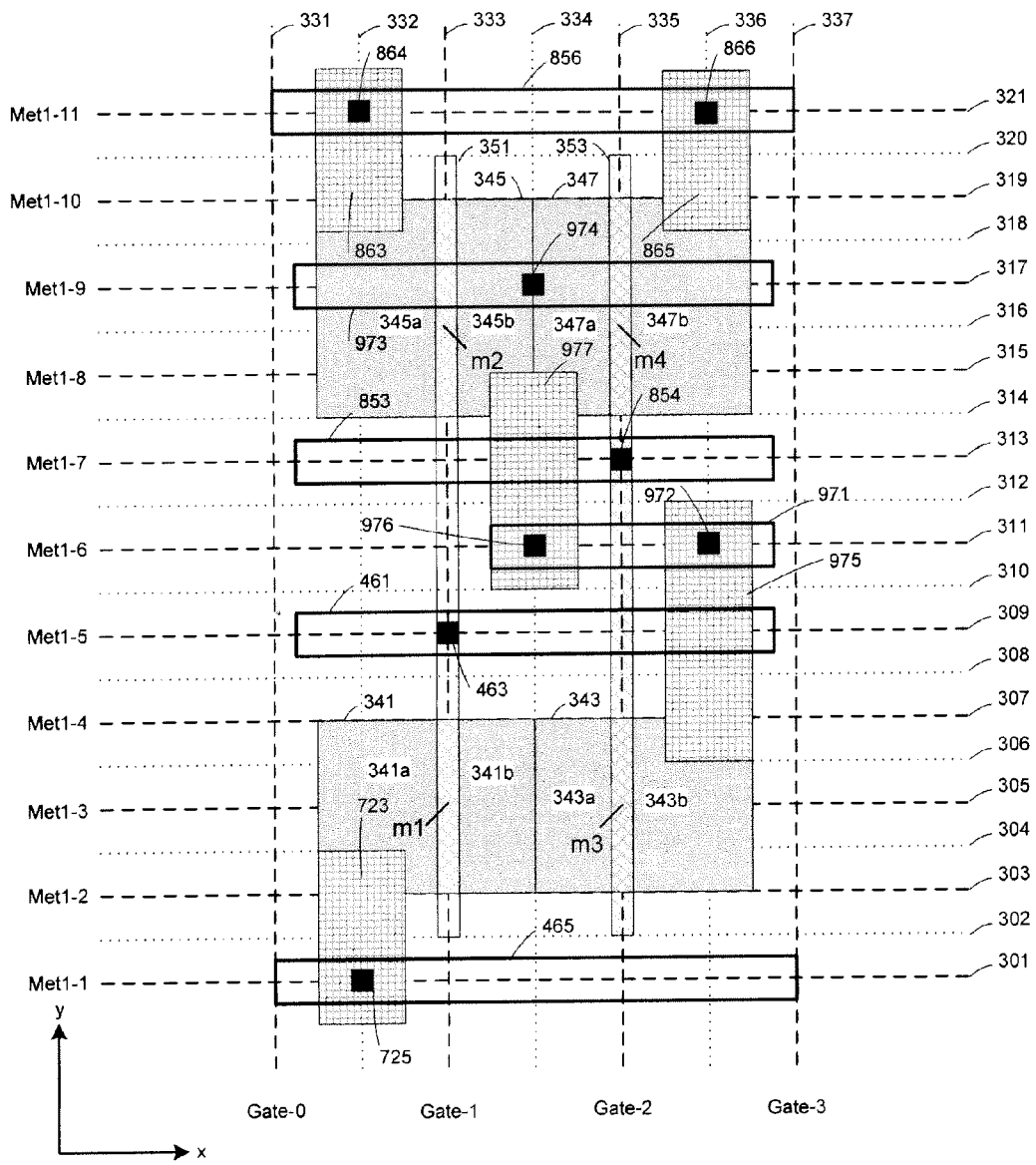
FIG. 9 shows a plan view of the two input NAND gate with all the connections made, in accordance with another embodiment of the present invention.

FIG. 9 shows a plan view of the two input NAND gate with all the connections made, in accordance with another embodiment of the present invention. In FIG. 9, the local interconnect structure 975 connects the diffusion region 343b of transistor m3 to the metal-1 structure 971, by way of contact structure 972. Similarly, the local-interconnect structure 977 connects the shared diffusion node (formed by diffusion regions 345b and 347a) to the metal-1 structure 971, by way of contact structure 976. In this example, the metal-1 structure 971 is chosen to go in an unused metal-1 track 6 (Met1-6). Also, the metal-1 structure 973 and diffusion contact 974 are used to create the output connection to output pin Y 115, as instructed by the "#" symbol appended to track assignments in the meta-data file of Table 2. The input and output pin nodes, as formed by metal-1 structures 461, 853, and 973, are made as wide as possible to give more connection points for the cell.

In one embodiment of the present invention the modified SPICE netlist of Table 2 is further extended to include the following information:
  Additional meta-data, including:
    i. Cell height in Metal-1 tracks added,
    ii. Input and output pins combined into "signal" pins, and
    iii. Node name added to each interconnect segment.
  Addition of abstract interconnect constructs, including:
    i. CMOS Connector (CMC),
    ii. Hole-to-Metal-1 (H2M1), and
    iii. Local Vertical Connector (LVC).
  Addition of components, including:
    i. Well taps,
    ii. Diodes, and
    iii. MOSFETs with different $V_T$ or gate oxide thickness.

Table 3 shows an example of a meta-file portion for a buffer circuit that included information for cell height in Metal-1 tracks, input and output pins combined into "signal" pins, node name added to each interconnect segment, and abstract interconnect constructs (CMC, H2M1, LVC).

The abstract interconnect constructs are used to construct interconnect in different ways depending on the technology. For example, a CMC could be implemented with a single local interconnect (LI) line, or it could be implemented without LI using two contacts, two Metal-1 lines, two via-1's, and one Metal-2 line. In one embodiment, the choice is made at "run time" based on switches or parameters in the technology file.

An H2M1 is used when a vertical line is connected to a horizontal Metal-1 line. If the vertical line is LI, then an H2M1 is implemented with a contact. If the vertical line is Metal-2, then the H2M1 is implemented with a Via-1.

An LVC is used for a vertical line which does not connect NMOS and PMOS transistors or a pin "port." In the meta-file example of Table 3, if the output "z" CMC is implemented in LI, then the port text is implemented in the LI text layer. If the "z" CMC is implemented in Metal-2, then the port text is implemented in the Metal-2 text layer.

TABLE 3

.subckt buf_1x1 a0 z vdd vss
* HEIGHT: M1, 10
* signal pins
2
a0, M1, 5, 2

TABLE 3-continued

```
z, LVC, 7, 5
* power supply pins
2
vss, 0
vdd, 10
* metal interconnect nodes
4
a0, 2, M1,5,0,4, CT,5,2
z,  1, CMC,2,2,7
n1, 3, M1,4,0,6, H2M1,4,1, CT,4,4
n1, 1, CMC,0,2,7
* name left gate right bulk model scaledW scaledL Xloc Yloc Type Ydrain Ygate Ysource
4
mn1,  n1,   a0,  vss,  vss,  nch,  10,  A,  1,  10, 2,  2,  5,  0
mn2,  vss,  n1,  z,    vss,  nch,  20,  A,  2,  5,  1,  0,  4,  2
mp1,  n1,   a0,  vdd,  vdd,  pch,  18,  A,  1,  46, 2,  7,  5,  0
mp2,  vdd,  n1,  z,    vdd,  pch,  35,  A,  2,  38, 1,  0,  4,  7
.ends
```

Figure 10:
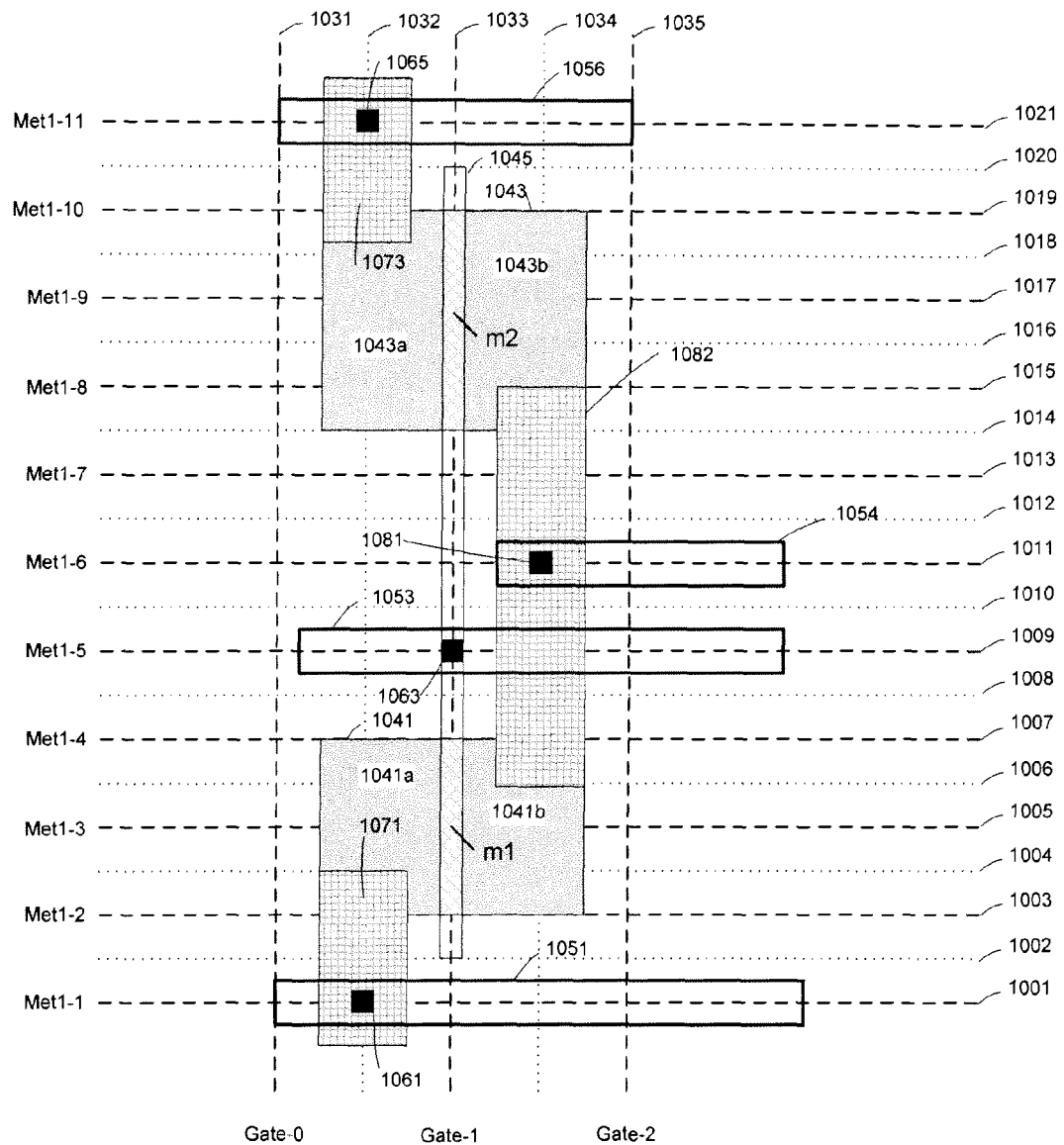
FIG. 10 shows a plan view of an inverter with all connections made, in accordance with one embodiment of the present invention.

FIG. 10 shows a plan view of an inverter with all connections made, in accordance with one embodiment of the present invention. The inverter includes diffusion regions 1041 and 1043, and a linear conductive structure 1045 that forms gate electrodes of the two transistors m1 and m2. An x-y grid defined by x-direction lines 1001-1021 and y-direction lines 1031-1035 is shown in FIG. 10 to aid with visualizing where the physical elements are placed. The inverter includes a power rail formed by a Metal-1 structure 1051 positioned along the Met1-1 line. The power rail structure 1051 is electrically connected to the diffusion region 1041a of transistor m1 by a contact 1061 and a local interconnect structure 1071. The inverter includes a power rail formed by a Metal-1 structure 1056 positioned along the Met1-11 line. The power rail structure 1056 is electrically connected to the diffusion region 1043a of transistor m2 by a contact 1065 and a local interconnect structure 1073. If the diffusion region 1041 is of n-type and the diffusion region 1043 is of p-type, then the power rail 1051 is connected to a reference ground and the power rail 1056 is connected to a power supply. If the diffusion region 1041 is of p-type and the diffusion region 1043 is of n-type, then the power rail 1051 is connected to a power supply and the power rail 1056 is connected to a reference ground.

The inverter includes an input formed by a Metal-1 structure 1053 positioned along the Met1-5 line. The Metal-1 structure 1053 is electrically connected to the linear conductive structure 1045 by a contact 1063. The linear conductive structure 1045 forms the gates of transistors m1 and m2 where it crosses diffusion regions 1041 and 1043, respectively. The inverter also includes an output node formed by a local interconnect structure 1082. An electrical connection to the output node is provided by a Metal-1 structure 1054 through contact 1081. The CMOS connector (CMC) in the inverter of FIG. 10 is formed by the local interconnect structure 1082. Also, the hole-to-Metal-1 (H2M1) in the inverter of FIG. 10 is formed by the contact 1081.

Figure 11:
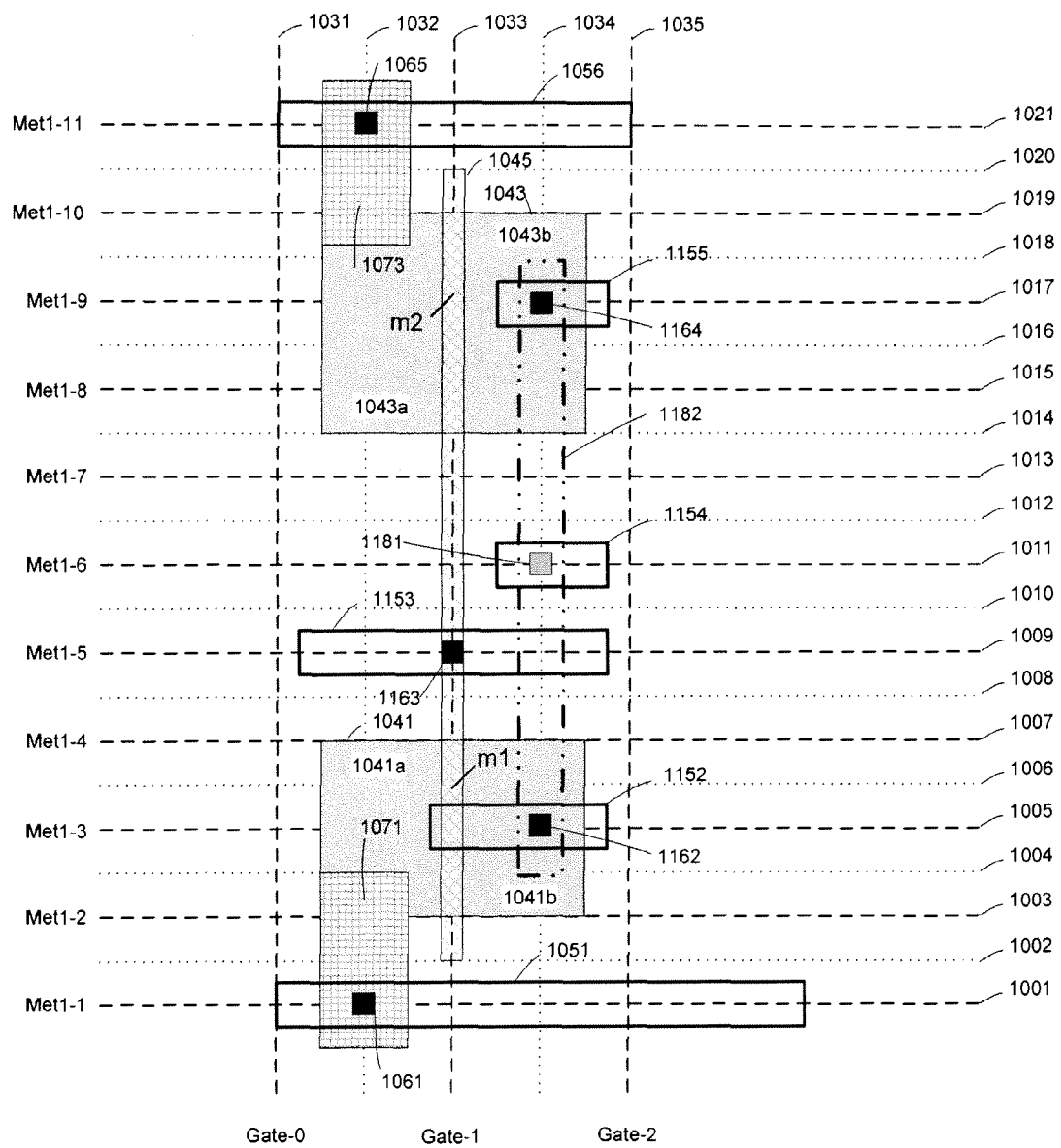
FIG. 11 shows a variation of the plan view of the inverter of FIG. 10, in accordance with one embodiment of the present invention.

FIG. 11 shows a variation of the plan view of the inverter of FIG. 10, in accordance with one embodiment of the present invention. In FIG. 11, the electrical connection to the output node is provided by a Metal-1 structure 1154. The Metal-1 structure 1154 is electrically connected to diffusion region 1041b through a via 1181, connected to a Metal-2 structure 1182, connected to a via 1162, connected to a Metal-1 structure 1152, connected to a contact vertically stacked beneath the via 1162, with the contact connected to the diffusion region 1041b. The Metal-1 structure 1154 is also electrically connected to diffusion region 1043b through the via 1181, connected to the Metal-2 structure 1182, connected to a via 1164, connected to a Metal-1 structure 1155, connected to a contact vertically stacked beneath the via 1164, with the contact connected to the diffusion region 1043b. The CMOS connector (CMC) in the inverter of FIG. 11 is formed by the contacts beneath the vias 1162 and 1164, and by the Metal-1 structures 1152 and 1155, and by the vias 1162 and 1164, and by the Metal-2 structure 1182. Also, the hole-to-Metal-1 (H2M1) in the inverter of FIG. 11 is formed by the via 1181.

It should be noted that the layout generator can connect nodes as required by the netlist, but the choice of interconnect approach and location of the interconnects is technology dependent. The figures discussed herein illustrate the layout solution for a one-dimensional gridded design style, but bent or two-dimensional shapes are also supported as illustrated in the power supply connection options of FIGS. 5 and 6.

Logic cells with functionality less complex and more complex than a two input NAND gate or inverter can be described in a similar fashion by the meta-data to instruct the layout generator on how to place and interconnect devices. Also, meta-data can be extended to describe other components which can be included in a SPICE netlist. Since different technology file sections may be selected for different portions of a circuit, for example analog or input-output circuits, these circuit regions can be identified in the meta-data file to allow the generator to produce corresponding layout regions with different design rules.

It should be appreciated that the layout generator and corresponding methods of the present invention can be extended to systems which include components at a higher level of complexity, along with interconnect that are technology dependent. Also, the layout generator method of the present invention can be further extended to any system which can be described by a list of components and the nets which interconnect them, with an implementation defined by a technology file.

The layout generator and associated methods of the present invention provide:

1. A meta-data object describing a circuit or other structure involving components and connections between components, including functional intent.
2. A computer executable tool using the meta-data object to create a structure with dimensions provided by a technology file.
3. A layout convention which conveys design intent.

4. A computer executable tool which can use design intent information to modify patterns to enhance manufacturability.
5. A final layout/structure derived from the meta-data object.
6. A computer executable tool for creating scaled and dimensioned (with actual dimensions) representations of the circuit defined by the meta-data object, such as a scaled and dimensioned SPICE model, a library exchange format (.LEF) file, and/or a design exchange format (.DEF) file, among others, which may be used by a place-and-route tool to fabricate the circuit.

Figure 12:
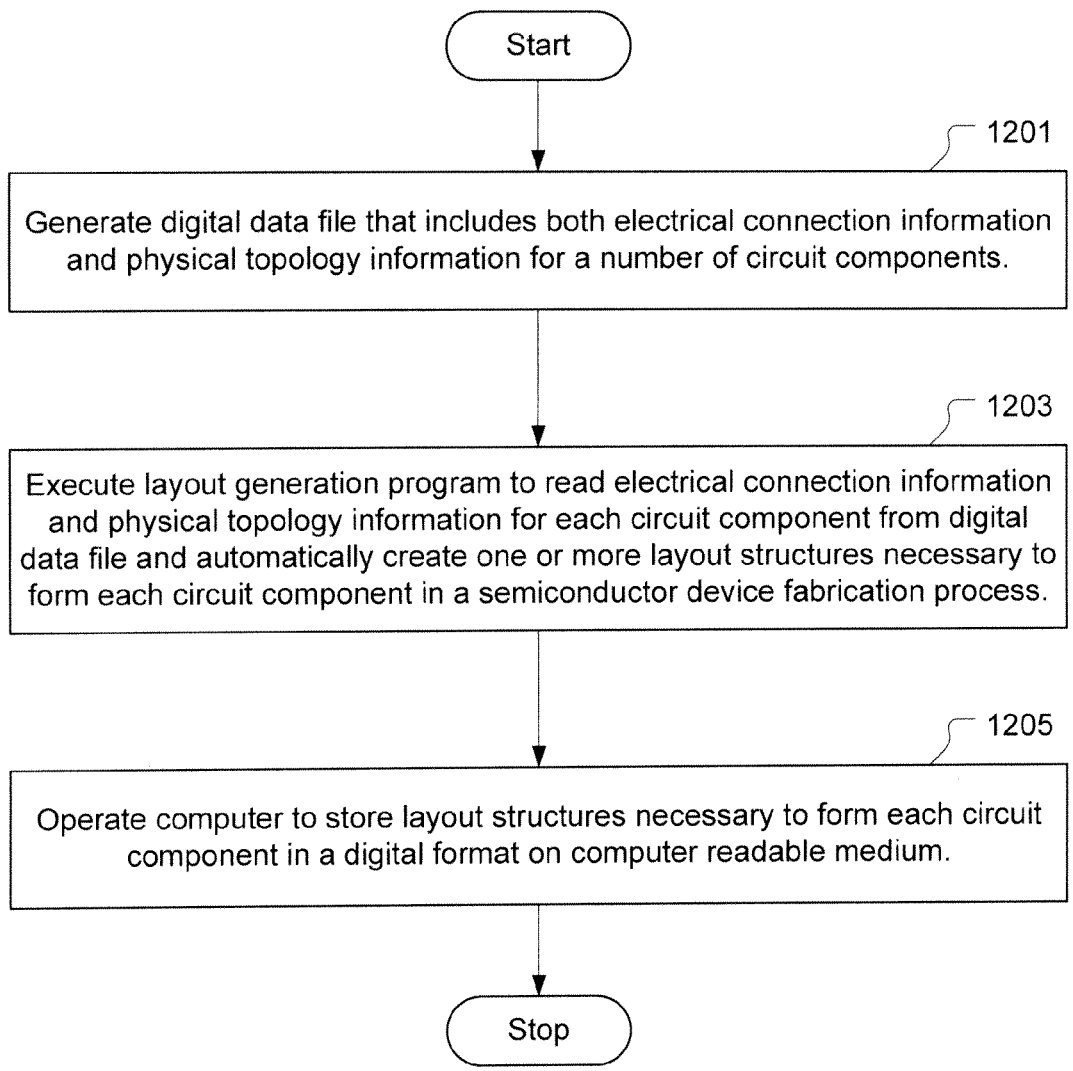
FIG. 12 shows a flowchart of a method for defining an integrated circuit, in accordance with one embodiment of the present invention.

FIG. 12 shows a flowchart of a method for defining an integrated circuit, in accordance with one embodiment of the present invention. The method includes an operation 1201 for generating a digital data file that includes both electrical connection information for a number of circuit components and physical topology information for the number of circuit components. The method also includes an operation 1203 for operating a computer to execute a layout generation program, whereby the layout generation program reads the electrical connection information and physical topology information for each of the number of circuit components from the digital data file and automatically creates one or more layout structures necessary to form each of the number of circuit components in a semiconductor device fabrication process, such that the one or more layout structures comply with the physical topology information read from the digital data file. The method further includes an operation 1205 for operating the computer to store the one or more layout structures necessary to form each of the number of circuit components in a digital format on a computer readable medium.

In one embodiment, the number of circuit components include a number of transistors. And, the physical topology information for one or more of the number of transistors includes a transistor width, a transistor channel length, a transistor center location in a first direction, and a transistor center location in a second direction perpendicular to the first direction, wherein the first direction extends perpendicular to the transistor width. In one embodiment, the transistor width is specified as a fractional multiple of a metal-1 structure pitch. In one embodiment, the transistor channel length is specified as a fractional multiple of a minimum channel length allowed by design rules of the semiconductor device fabrication process. In one embodiment, the transistor center location in the first direction is specified as a particular transistor gate electrode track number. In one embodiment, the transistor center location in the second direction is specified as a fractional multiple of a metal-1 structure pitch.

Also, in one embodiment, the physical topology information for one or more of the number of transistors further includes a drain connection center location in the second direction, a gate connection center location in the second direction, and a source connection center location in the second direction. In one embodiment, each of the drain, gate, and source center locations in the second direction is specified as a fractional multiple of a higher-level metal structure pitch. Additionally, in one embodiment, the physical topology information for one or more of the number of transistors further includes a transistor diffusion region extension specification in the first direction. It should be understood, however, that in other embodiments of the method, the digital data file can include essentially any additional physical topology information not explicitly identified herein.

In one embodiment, the method of FIG. 12 also includes an operation for generating a digital technology file that includes physical dimensions corresponding to a number of variables used for physical topology information in the digital data file. In this embodiment, the layout generation program reads the physical dimensions from the digital technology file and substitutes the physical dimensions for the corresponding variables in the physical topology information in the digital data file. Also, in this embodiment, the method can further includes an operation for adjusting the physical dimensions within the digital technology file without adjusting the corresponding variables in the physical topology information in the digital data file.

Figure 13:
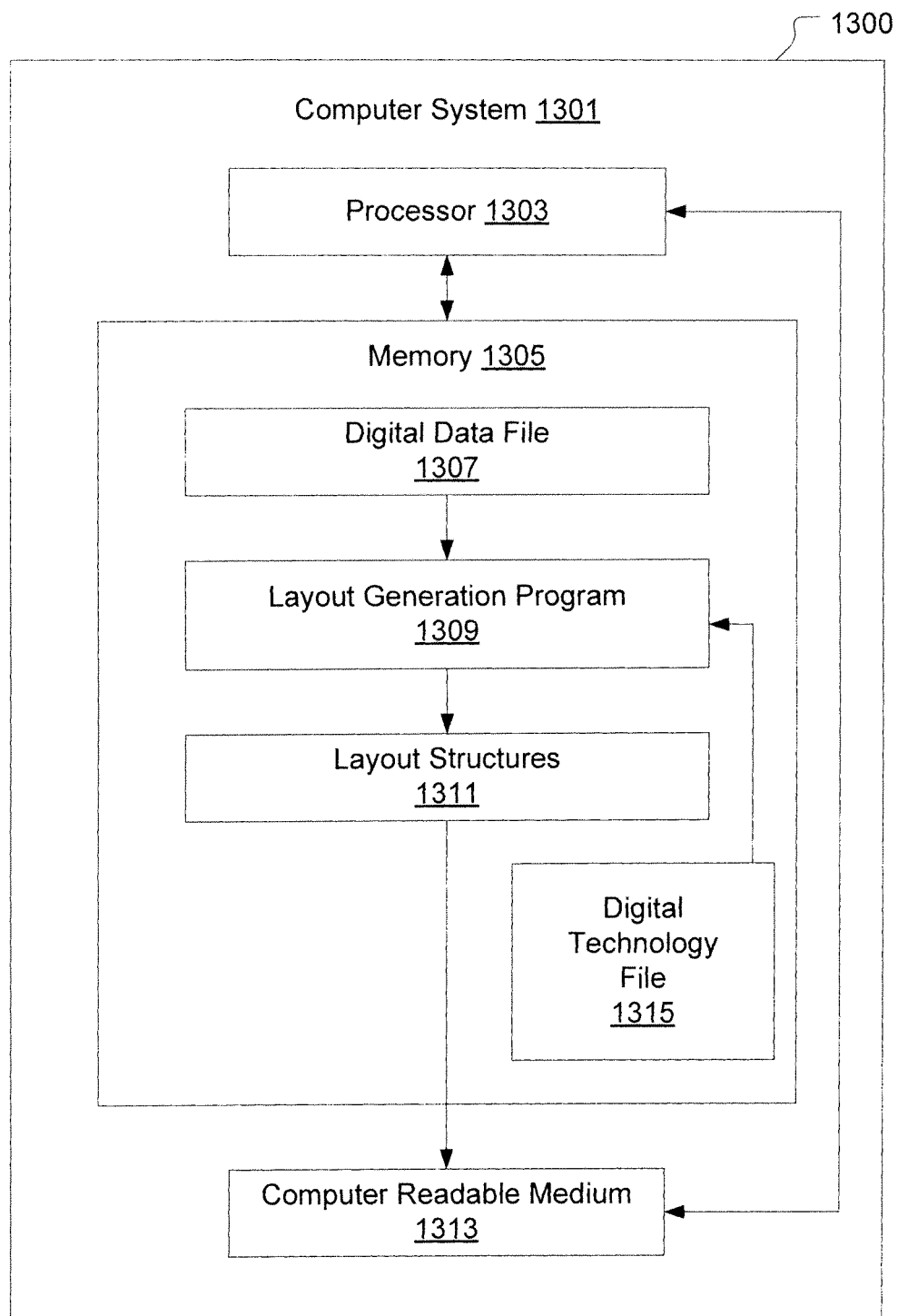
FIG. 13 shows a system for defining an integrated circuit, in accordance with one embodiment of the present invention.

FIG. 13 shows a system 1300 for defining an integrated circuit, in accordance with one embodiment of the present invention. The system 1300 includes a computer system 1301 including a processor 1303 and a memory 1305. The system 1300 also includes a digital data file 1307 stored in the memory 1305. The digital data file 1307 includes both electrical connection information for a number of circuit components and physical topology information for the number of circuit components. The system 1300 further includes a layout generation program 1309 stored as a set of computer executable instructions in the memory 1305. The layout generation program 1309 is defined to read the electrical connection information and physical topology information for each of the number of circuit components from the digital data file 1307 and automatically create a digital representation of one or more layout structures 1311 necessary to form each of the number of circuit components in a semiconductor device fabrication process, such that the one or more layout structures comply with the physical topology information read from the digital data file 1307. The layout generation program 1309 is further defined to store the digital representation of the one or more automatically created layout structures 1311 in a digital format on a computer readable medium 1313.

In one embodiment, the system 1300 also includes a digital technology file 1315 stored in the memory 1305. The digital technology file 1315 includes physical dimensions corresponding to a number of variables used for physical topology information in the digital data file 1307. The layout generation program 1309 is defined to read the physical dimensions from the digital technology file 1315 and substitute the physical dimensions for the corresponding variables in the physical topology information in the digital data file 1307.

In one embodiment of the system 1300, the number of circuit components include a number of transistors. And, in one embodiment, the physical topology information for one or more of the number of transistors includes a transistor width, a transistor channel length, a transistor center location in a first direction, and a transistor center location in a second direction perpendicular to the first direction, wherein the first direction extends perpendicular to the transistor width. In one embodiment, the transistor width is specified as a fractional multiple of a metal-1 structure pitch. In one embodiment, the transistor channel length is specified as a fractional multiple of a minimum channel length allowed by design rules of the semiconductor device fabrication process. In one embodiment, the transistor center location in the first direction is specified as a particular transistor gate electrode track number. In one embodiment, the transistor center location in the second direction is specified as a fractional multiple of a metal-1 structure pitch.

Also, in one embodiment of the system 1300, the physical topology information for one or more of the number of transistors further includes a drain connection center location in the second direction, a gate connection center location in the second direction, and a source connection center location in the second direction. In one embodiment, each of the drain, gate, and source center locations in the second direction is specified as a fractional multiple of a higher-level metal structure pitch. Additionally, in one embodiment of the system 1300, the physical topology information for one or more of the number of transistors further includes a transistor diffusion region extension specification in the first direction. It should be understood, however, that in other embodiments of the system 1300, the digital data file can include essentially any additional physical topology information not explicitly identified herein.

It should be understood that in one embodiment the invention described herein can be embodied as computer readable code on a computer readable medium. For example, the computer readable code can include computer executable program instructions for operating the layout generator. The computer readable code can also include program instructions for generating layout libraries and/or cells can also be stored in a digital format on a computer readable medium.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the layouts generated by the layout generator and associated methods disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for defining an integrated circuit, comprising:
   obtaining a physical layout of the integrated circuit, wherein obtaining the physical layout of the integrated circuit includes generating a digital data file that includes electrical connection information and physical topology information for transistors that define the integrated circuit, wherein each transistor within the integrated circuit has a corresponding linear-shaped gate electrode structure oriented to extend lengthwise in a first direction,
   wherein the electrical connection information for each transistor includes an identification of an electrical node to which a gate terminal of the transistor is connected, and an identification of an electrical node to which a source terminal of the transistor is connected, and an identification of an electrical node to which a drain terminal of the transistor is connected, and
   wherein the physical topology information for each transistor includes a transistor width as measured in the first direction, and a transistor length as measured in a second direction perpendicular to the first direction, and a transistor center horizontal position, and a transistor center vertical position, and
   wherein obtaining the physical layout of the integrated circuit includes executing a layout generator on a computer to generate a physical layout of the integrated circuit based on the electrical connection information and physical topology information for transistors included in the digital data file, wherein the layout generator is configured to determine which one of multiple interconnect structure options is appropriate for implementation in the physical layout based on switches or parameters in the digital data file, and
   wherein obtaining the physical layout of the integrated circuit includes recording data defining the physical layout of the integrated circuit on a non-transitory computer readable storage medium in a format suitable for fabrication of the integrated circuit; and
   utilizing the physical layout of the integrated circuit to fabricate the integrated circuit.

2. A method for defining an integrated circuit as recited in claim 1, wherein the physical topology information for each transistor further includes one or more of a transistor gate connection center vertical position, and a transistor source connection center vertical position, and a transistor drain connection center vertical position.

3. A method for defining an integrated circuit as recited in claim 2, wherein the physical topology information for each transistor further includes a transistor type specification indicating whether or not a diffusion region of the transistor is extended either 1) in a rightward horizontal direction relative to a gate electrode of the transistor, or 2) in a leftward horizontal direction relative to the gate electrode of the transistor, or 3) in both the rightward horizontal direction relative to the gate electrode of the transistor and in the leftward horizontal direction relative to the gate electrode of the transistor, or 4) in neither the rightward horizontal direction relative to the gate electrode of the transistor nor the leftward horizontal direction relative to the gate electrode of the transistor.

4. A method for defining an integrated circuit as recited in claim 2, wherein the transistor gate connection center vertical position is specified by a fractional multiple of a higher-level metal structure pitch.

5. A method for defining an integrated circuit as recited in claim 2, wherein the transistor source connection center vertical position is specified by a fractional multiple of a higher-level metal structure pitch.

6. A method for defining an integrated circuit as recited in claim 2, wherein the transistor drain connection center vertical position is specified by a fractional multiple of a higher-level metal structure pitch.

7. A method for defining an integrated circuit as recited in claim 1, wherein the physical topology information for one or more transistors includes specification of the transistor width in units of metal-1 pitch.

8. A method for defining an integrated circuit as recited in claim 1, wherein the physical topology information includes specification of a cell height in units of metal-1 tracks.

9. A method for defining an integrated circuit as recited in claim 1, further comprising:
generating a digital technology file that includes physical dimensions corresponding to a number of variables used for the physical topology information in the digital data file.

10. A method for defining an integrated circuit as recited in claim 9, wherein processing the digital data file to generate the physical layout of the integrated circuit for fabrication includes accessing the physical dimensions from the digital technology file and substituting the physical dimensions for the number of variables in the physical topology information.

11. A method for defining an integrated circuit as recited in claim 1, further comprising:
adjusting the physical dimensions within the digital technology file without adjusting the number of variables in the physical topology information in the digital data file.

12. A system for defining a physical layout of an integrated circuit, comprising:
a digital data file including electrical connection information and physical topology information for transistors that define the integrated circuit, wherein each transistor within the integrated circuit has a corresponding linear-shaped gate electrode structure oriented to extend lengthwise in a first direction,
wherein the electrical connection information for each transistor includes an identification of an electrical node to which a gate terminal of the transistor is connected, and an identification of an electrical node to which a source terminal of the transistor is connected, and an identification of an electrical node to which a drain terminal of the transistor is connected, and
wherein the physical topology information for each transistor includes a transistor width as measured in the first direction, and a transistor length as measured in a second direction perpendicular to the first direction, and a transistor center horizontal position, and a transistor center vertical position; and
a special purpose computer configured to execute a layout generator to automatically generate the physical layout of the integrated circuit based on the electrical connection information and physical topology information for transistors included in the digital data file, wherein the layout generator is configured to automatically determine which one of multiple interconnect structure options is appropriate for implementation in the physical layout based on switches or parameters in the digital data file, and
a non-transitory computer readable storage medium having data recorded thereon defining the physical layout of the integrated circuit in a format suitable for fabrication of the integrated circuit.

13. A system for defining a physical layout of an integrated circuit as recited in claim 12, wherein the physical topology information for each transistor further includes one or more of a transistor gate connection center vertical position, and a transistor source connection center vertical position, and a transistor drain connection center vertical position.

14. A system for defining a physical layout of an integrated circuit as recited in claim 13, wherein the physical topology information for each transistor further includes a transistor type specification indicating whether or not a diffusion region of the transistor is extended either 1) in a rightward horizontal direction relative to a gate electrode of the transistor, or 2) in a leftward horizontal direction relative to the gate electrode of the transistor, or 3) in both the rightward horizontal direction relative to the gate electrode of the transistor and in the leftward horizontal direction relative to the gate electrode of the transistor, or 4) in neither the rightward horizontal direction relative to the gate electrode of the transistor nor the leftward horizontal direction relative to the gate electrode of the transistor.

15. A system for defining a physical layout of an integrated circuit as recited in claim 13, wherein the transistor gate connection center vertical position is specified by a fractional multiple of a higher-level metal structure pitch.

16. A system for defining a physical layout of an integrated circuit as recited in claim 13, wherein the transistor source connection center vertical position is specified by a fractional multiple of a higher-level metal structure pitch.

17. A system for defining a physical layout of an integrated circuit as recited in claim 13, wherein the transistor drain connection center vertical position is specified by a fractional multiple of a higher-level metal structure pitch.

18. A system for defining a physical layout of an integrated circuit as recited in claim 12, wherein the physical topology information for one or more transistors includes specification of the transistor width in units of metal-1 pitch.

19. A system for defining a physical layout of an integrated circuit as recited in claim 12, wherein the physical topology information includes specification of a cell height in units of metal-1 tracks.

20. A system for defining a physical layout of an integrated circuit as recited in claim 12, further comprising:
   a digital technology file including physical dimensions corresponding to a number of variables used for the physical topology information in the digital data file.

21. A system for defining a physical layout of an integrated circuit as recited in claim 20, wherein the layout generator is configured to access the physical dimensions from the digital technology file and substitute the physical dimensions for the number of variables in the physical topology information.

22. A system for defining a physical layout of an integrated circuit as recited in claim 20, wherein the digital technology file is separate from the digital data file, such that adjustment of the physical dimensions within the digital technology file does not require adjustment of the number of variables in the physical topology information in the digital data file.

\* \* \* \* \*